United States Patent

Kuwana et al.

(10) Patent No.: US 9,676,959 B2
(45) Date of Patent: Jun. 13, 2017

(54) POLYMERIZABLE COMPOSITION SOLUTION AND OPTICALLY ANISOTROPIC BODY INCLUDING THE SAME

(71) Applicant: DIC Corporation, Tokyo (JP)

(72) Inventors: Yasuhiro Kuwana, Kita-adachi-gun (JP); Hidetoshi Nakata, Kita-adachi-gun (JP); Koichi Endou, Kita-adachi-gun (JP); Mika Yamamoto, Kita-adachi-gun (JP); Kunihiko Kotani, Kita-adachi-gun (JP); Hiroshi Hasebe, Kita-adachi-gun (JP); Yoshiyuki Ono, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/890,453

(22) PCT Filed: May 23, 2014

(86) PCT No.: PCT/JP2014/063695
§ 371 (c)(1),
(2) Date: Nov. 11, 2015

(87) PCT Pub. No.: WO2014/192655
PCT Pub. Date: Dec. 4, 2014

(65) Prior Publication Data
US 2016/0115338 A1 Apr. 28, 2016

(30) Foreign Application Priority Data
May 29, 2013 (JP) ................. 2013-112918

(51) Int. Cl.
C09D 133/14 (2006.01)
G02F 1/13 (2006.01)
C08F 220/30 (2006.01)
C08F 222/10 (2006.01)
G02B 5/30 (2006.01)
C08F 220/18 (2006.01)
G02F 1/13363 (2006.01)
C09K 19/00 (2006.01)
C09D 135/02 (2006.01)

(52) U.S. Cl.
CPC .......... C09D 133/14 (2013.01); C08F 220/18 (2013.01); C08F 220/30 (2013.01); C08F 222/10 (2013.01); C09D 135/02 (2013.01); C09K 19/00 (2013.01); G02B 5/3016 (2013.01); G02B 5/3083 (2013.01); G02F 1/13363 (2013.01); C08F 2220/302 (2013.01); C08F 2222/1013 (2013.01); G02F 2202/023 (2013.01)

(58) Field of Classification Search
CPC ............... C09D 133/14; G02F 1/13363; G02F 2202/023; C08F 220/30; C08F 220/18; C08F 222/10; C08F 2220/302; C08F 2222/1013; G02B 5/3083; G02B 5/3016; C09K 19/00
USPC ........................................................ 526/334
See application file for complete search history.

(56) References Cited

U.S. PATENT DOCUMENTS

2003/0203128 A1* 10/2003 Shundo .................. C09K 19/32
428/1.1
2010/0258764 A1* 10/2010 Sakamoto ......... C08F 222/1006
252/299.64

FOREIGN PATENT DOCUMENTS

| JP | 2003-238491 A | 8/2003 | |
|---|---|---|---|
| JP | 2006-308725 A | 11/2006 | |
| JP | 2008-291218 A | 12/2008 | |
| JP | 2008291218 A | * 12/2008 | |
| JP | 2009-184974 A | 8/2009 | |
| JP | 2009184974 A | * 8/2009 | |
| JP | 2010-250172 A | 11/2010 | |
| JP | 2012-256007 A | 12/2012 | |
| JP | 2012256007 A | * 12/2012 | |
| JP | WO 2013015077 A1 | * 1/2013 | ......... C09K 19/2007 |
| WO | 2013/015077 A1 | 1/2013 | |

OTHER PUBLICATIONS

International Search Report dated Jul. 22, 2014, issued in counterpart application No. PCT/JP2014/063695 (3 pages).

* cited by examiner

Primary Examiner — Michael M Bernshteyn
(74) Attorney, Agent, or Firm — Westerman, Hattori, Daniels & Adrian, LLP

(57) ABSTRACT

A polymerizable composition solution that has good storage stability and allows a polymerizable compound in the polymerizable composition to be aligned well with no defects after application to a base and removal of a solvent by a drying process and also an optically anisotropic body that includes the solution and has good alignment without any defects. A solution containing a polymerizable composition and an organic solvent, wherein the polymerizable composition contains 90 mass % or more of a polymerizable compound intramolecularly having a 2-methyl-1,4-phenylene group as represented by general formula (1) and an optically anisotropic body including the solution.

12 Claims, No Drawings

POLYMERIZABLE COMPOSITION SOLUTION AND OPTICALLY ANISOTROPIC BODY INCLUDING THE SAME

TECHNICAL FIELD

The present invention relates to a polymerizable composition solution useful as a component of an optically anisotropic body used for optical compensation for, for example, liquid crystal devices, displays, optical elements, optical components, coloring agents, security markings, members for laser luminescence, and liquid crystal displays and relates to an optically anisotropic body including the solution.

BACKGROUND ART

Polymerizable composition solutions are useful as components of optically anisotropic bodies. Optically anisotropic bodies are applied to various liquid crystal displays as, for example, retardation films (films), retardation patterned films, and homogeneously aligned liquid crystal films. Retardation films are obtained by applying a polymerizable composition solution to a substrate and heating the polymerizable composition solution or curing a polymerizable composition through irradiation with active energy rays while the polymerizable composition solution is aligned by, for example, an alignment film.

In general, a polymerizable composition solution to be applied is used with a polymerizable composition dissolved in an organic solvent. This requires a drying process for removing the solvent by, for example, performing heating after application of the polymerizable composition solution to a substrate. After the organic solvent is removed by the drying process, a polymerizable liquid crystal compound in the polymerizable composition needs to be aligned on the substrate. It is necessary to align the polymerizable liquid crystal compound well with no defects in a wider temperature range for a long time because there are various processes for obtaining a retardation film.

A composition containing a (meth)acrylate compound has been proposed as an example of a polymerizable liquid crystal composition with good alignment properties, but the composition lacks sufficient alignment properties (PTL 1). A polymerizable liquid crystal compound with an azine backbone and a composition containing the polymerizable liquid crystal compound have been disclosed (PTL 2). PTL 2, however, discloses only the alignment properties of the polymerizable liquid crystal composition helically aligned with respect to a substrate. The alignment properties of the polymerizable liquid crystal composition that is horizontally aligned with respect to the substrate or vertically aligned with respect to the substrate are not known. The polymerizable liquid crystal compound with an azine backbone is unsuitable for retardation films because the compound is colored (PTL 2).

In addition, a method for aligning a polymerizable liquid crystal composition well may often involve improving the alignment properties of liquid crystal in an alignment film. For example, PTL 3 discloses an alignment film solution containing a hydrolysate of an alkoxysilane compound, a polymeric material having a hydroxyl group, and a cross-linking agent. PTL 4 discloses an alignment film containing a siloxane compound with an alkylsiloxane backbone.

As described above, there is a need to develop a polymerizable composition solution that allows a polymerizable compound in a polymerizable composition to be aligned well with no defects after application to a base and removal of a solvent by a drying process.

CITATION LIST

PTL

PTL 1: Japanese Unexamined Patent Application Publication No. 2009-184974
PTL 2: Japanese Unexamined Patent Application Publication No. 2008-291218
PTL 3: Japanese Unexamined Patent Application Publication No. 2006-308725
PTL 4: Japanese Unexamined Patent Application Publication No. 2010-250172

SUMMARY OF INVENTION

Technical Problem

An object of the present invention is to provide a polymerizable composition solution that has good storage stability and allows a polymerizable compound in the polymerizable composition to be aligned well with no defects after application to a base and removal of an organic solvent by a drying process and to provide an optically anisotropic body that includes the solution and has good alignment without any defects.

Solution to Problem

In the present invention, intensive studies on combination of various polymerizable compounds in order to achieve the above object have revealed that a polymerizable composition solution including a polymerizable composition containing 90 mass % or more of a polymerizable compound having a particular structure has good storage stability and the use of the solution provides an optically anisotropic body with good alignment and no defects, completing the present invention.

That is, the present invention provides a solution containing a polymerizable composition and an organic solvent, wherein the polymerizable composition contains 90 mass % or more of a polymerizable compound intramolecularly having a 2-methyl-1,4-phenylene group and provides an optically anisotropic body including the solution.

Advantageous Effects of Invention

The use of the polymerizable composition solution according to the present invention can provide a solution with good storage stability and an optically anisotropic body with good alignment and no defects.

DESCRIPTION OF EMBODIMENTS

The best mode of the polymerizable composition solution according to the present invention will be described below. The polymerizable composition solution according to the present invention contains a polymerizable composition and an organic solvent. The polymerizable composition contains 90 mass % or more of at least one polymerizable compound selected from polymerizable compounds represented by general formula (1).

[Chem. 1]

$$R^1-(A^1-Z^1)_m-\underset{\underset{}{\bigcirc}}{\overset{CH_3}{\bigcirc}}-(Z^2-A^2)_n-R^2 \quad (1)$$

(wherein $R^1$ and $R^2$ each independently represent a hydrogen atom, a halogeno group, a cyano group, a C1 to C8 alkyl group, or a P-Sp-group (where P represents a polymerizable functional group; Sp represents a C0 to C18 spacer group; when two or more P are intramolecularly present, two or more P may be the same or different; and when two or more Sp are intramolecularly present, two or more Sp may be the same or different), one —CH2- or two or more nonadjacent —CH2- in the alkyl group may be each independently substituted with —CH=CH—, —C≡C—, —O—, —CO—, —COO—, or —OCO—, and at least one hydrogen atom in the alkyl group may be substituted with a fluorine atom or a chlorine atom, and at least one of $R^1$ and $R^2$ represents a P-Sp-group;

$A^1$ and $A^2$ each independently represent a group selected from the group consisting of:

(a) a 1,4-cyclohexylene group (one —$CH_2$— or two or more nonadjacent —$CH_2$— in this group may be substituted with —O— or —S—), (b) a 1,4-phenylene group (one —CH= or two or more nonadjacent —CH= in this group may be substituted with —N=), and (c) a 1,4-cyclohexenylene group, a 2,4-cyclopentadiene-2,5-diyl group, a thiophene-2,5-diyl group, a furan-2,5-diyl group, a piperidine-2,5-diyl group, a naphthalene-2,6-diyl group, a naphthalene-1,4-diyl group, a naphthalene-1,5-diyl group, a 1,2,3,4-tetrahydronaphthalene-2,6-diyl group, and a decahydronaphthalene-2,6-diyl group, wherein the group (a), group (b), or group (c) described above may be each independently substituted with a cyano group, a fluorine atom, a chlorine atom, or a C1 to C4 alkyl group;

$Z^1$ and $Z^2$ each independently represent a single bond, —$CH_2CH_2$—, —$(CH_2)_4$—, —$OCH_2$—, —$CH_2O$—, —$OCF_2$—, —$CF_2O$—, —COO—, —OCO—, —C≡C—, —C≡C—OCO—, or —OCO—C≡C—; and m and n each independently represent 0, 1, 2, 3, or 4, and m+n is four or less. When m is 2 to 4 and two or more $A^1$ and $Z^1$ are present, two or more $A^1$ and two or more $Z^1$ may each be the same or different. When n is 2 to 4 and two or more $A^2$ and $Z^2$ are present, two or more $A^2$ and two or more $Z^2$ may each be the same or different.)

The polymerizable functional group represented by P is preferably a vinyl group, a vinyl ether group, an acrylic group, a (meth)acrylic group, a glycidyl group, an oxetanyl group, a maleimide group, and a thiol group, and particularly preferably a vinyl ether group, an acrylic group, a (meth)acrylic group, or a glycidyl group from the viewpoint of productivity.

Sp represents a C0 to C18 spacer group, and specifically represents a single bond or an alkylene group (the alkylene group may be substituted with at least one halogen atom or CN, and one $CH_2$ group or two or more nonadjacent $CH_2$ groups in this group may be each independently substituted with —O—, —S—, —NH—, —N($CH_2$)—, —CO—, —COO—, —OCO—, —OCOO—, —SCO—, —COS—, or —C≡C—, as long as oxygen atoms are not directly bonded to each other.

The polymerizable composition in the present invention preferably contains 90 mass % or more of the polymerizable compound represented by general formula (1), more preferably contains 91 mass % or more of the polymerizable compound, still more preferably contains 93 mass % or more of the polymerizable compound, particularly preferably contains 95 mass % or more of the polymerizable compound, in order to obtain a polymerizable composition solution with good storage stability. The upper limit of the content of the polymerizable compound represented by general formula (1) is preferably, but not necessarily, 100 mass %.

The polymerizable composition in the present invention preferably contains a polymerizable compound represented by general formula (1-1) described below, which is a polymerizable compound represented by general formula (1) with $R^1$ and $R^2$ each representing a P-Sp-group.

[Chem. 2]

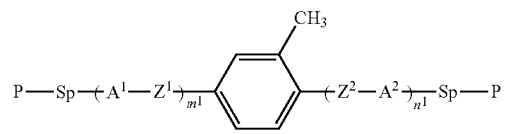

(1-1)

(wherein $A^1$, $A^2$, $Z^1$, $Z^2$, $m^1$, $n^1$, P, and Sp have the same meaning as $A^1$, $A^2$, $Z^1$, $Z^2$, m, n, P, and Sp as defined in general formula (1) described above, respectively.)

The compounds having two polymerizable functional groups have a cross-linked structure after polymerization. Thus, one or two of the compounds are preferably used in order to obtain an optically anisotropic body with good alignment.

Of the compounds represented by general formula (1-1), compounds in which the ring structures of $A^1$ and $A^2$ have no substituent except for a methyl group are preferred in terms of compatibility with other compounds.

Examples of the compounds represented by general formula (1-1) include, but are not limited to, the compounds described below.

[Chem. 3]

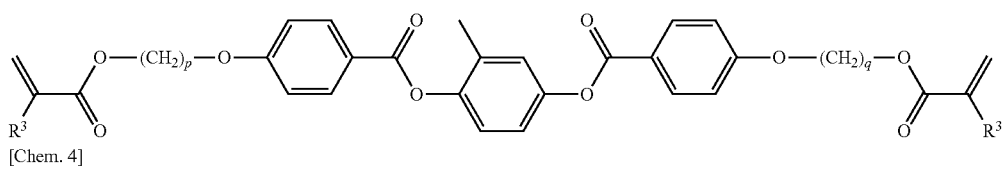

(1-1-1)

[Chem. 4]

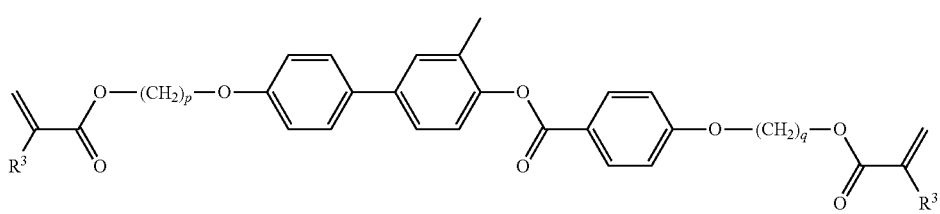

(1-1-2)

-continued

[Chem. 5]

(1-1-3)

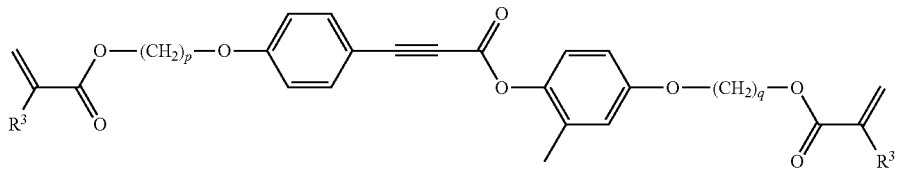

[Chem. 6]

(1-1-4)

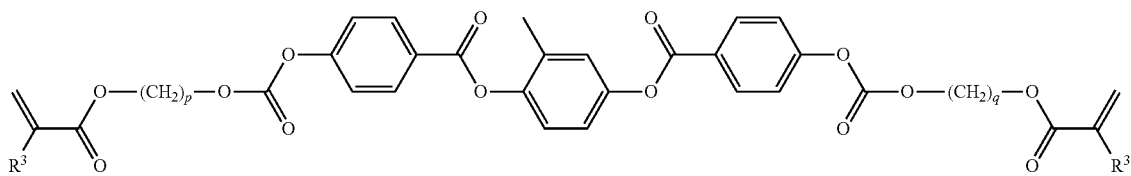

[Chem. 7]

(1-1-5)

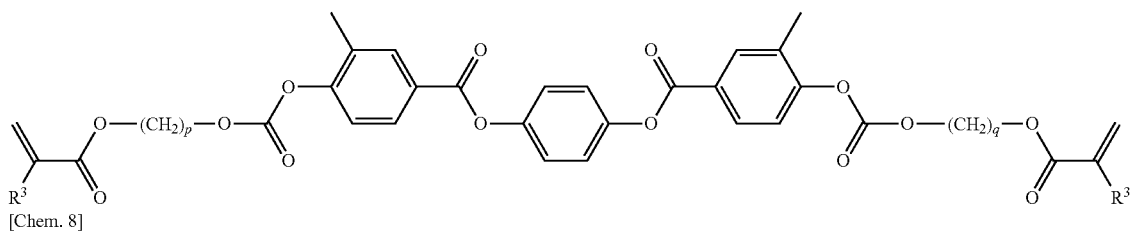

[Chem. 8]

(1-1-6)

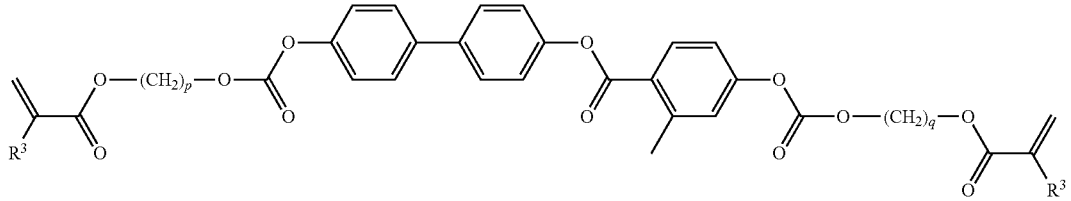

[Chem. 9]

(1-1-7)

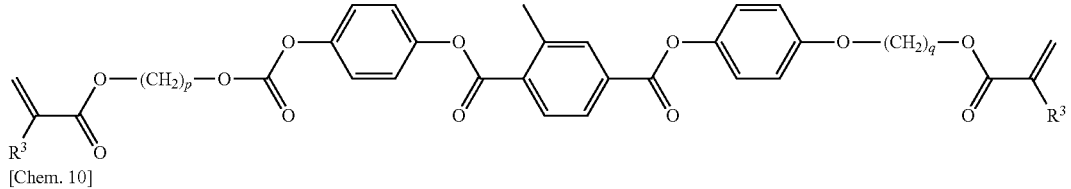

[Chem. 10]

(1-1-8)

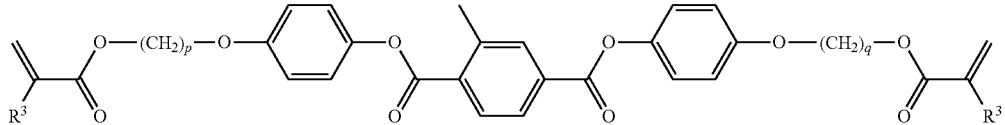

(wherein p and q each independently represent an integer of 1 to 18, and $R^3$ represents a hydrogen atom or a methyl group.) These compounds may be used alone or may be used in a mixture of two or more.

The total content of the compound represented by general formula (1-1) is preferably 30 to 90 mass %, more preferably 35 to 85 mass %, particularly preferably 40 to 80 mass % in the entire polymerizable composition from the viewpoint of storage stability in the form of a solution.

The polymerizable composition in the present invention preferably contains a polymerizable compound represented by general formula (1-2) described below, which is a polymerizable compound represented by general formula (1) with $R^1$ representing a P-Sp-group.

[Chem. 11]

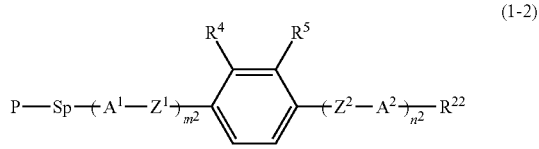

(1-2)

(wherein $A^1$, $A^2$, $Z^1$, $Z^2$, $m^2$, $n^2$, P, and Sp have the same meaning as $A^1$, $A^2$, $Z^1$, $Z^2$, m, n, P, and Sp as defined in general formula (1) described above, respectively.

One of $R^4$ and $R^5$ represents a hydrogen atom and the other represents a methyl group, $R^{22}$ represents a hydrogen atom, a halogeno group, a cyano group, or a C1 to C8 alkyl group, and one —$CH_2$— or two or more nonadjacent —$CH_2$— in the alkyl group may be each independently substituted with —CH=CH—, —C≡C—, —O—, —CO—, —COO—, or —OCO—, and at least one hydrogen atom in the alkyl group may be substituted with a fluorine atom or a chlorine atom.) One or two of the compounds having one polymerizable functional group are preferably used from the viewpoint of compatibility in the form of a solution.

Of the compounds represented by general formula (1-2), compounds in which the ring structures of $A^1$ and $A^2$ have no substituent except for a methyl group are preferred in terms of compatibility with other compounds.

In particular, the compounds in which the ring structures of $A^1$ and $A^2$ have no substituent except for a methyl group, of the compounds represented by general formulas (1-1) and (1-2) described above, are preferred because the main backbones of these compounds have the same structure to give good compatibility with each other and thus improve the storage stability in the form of a solution.

Examples of the compounds represented by general formula (1-2) include, but are not limited to, the compounds described below.

[Chem. 12]

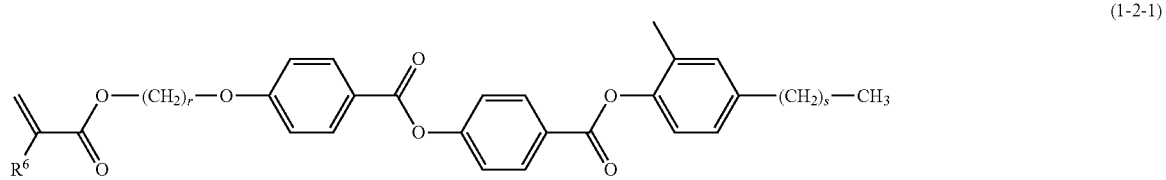

(1-2-1)

[Chem. 13]

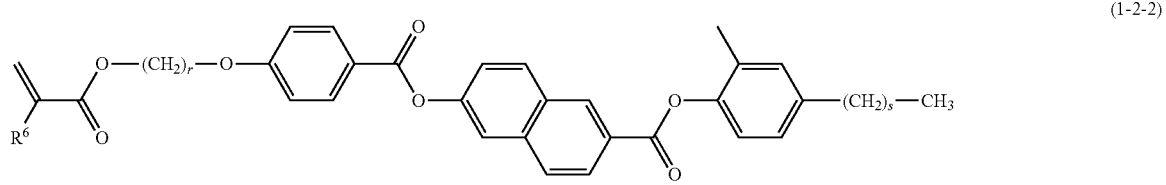

(1-2-2)

[Chem. 14]

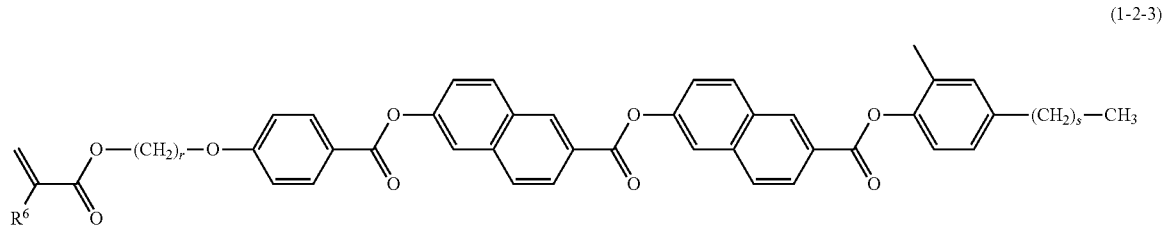

(1-2-3)

[Chem. 15]

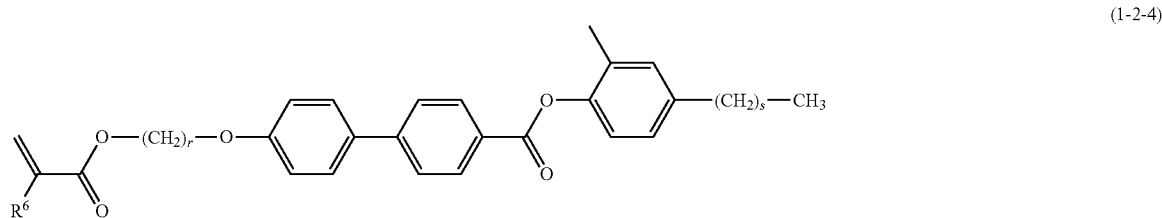

(1-2-4)

-continued
[Chem. 16]
(1-2-5)
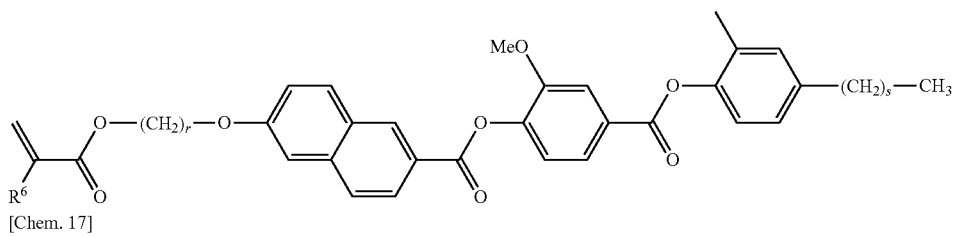
[Chem. 17]
(1-2-6)
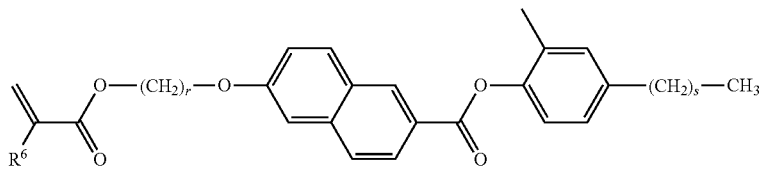
[Chem. 18]
(1-2-7)
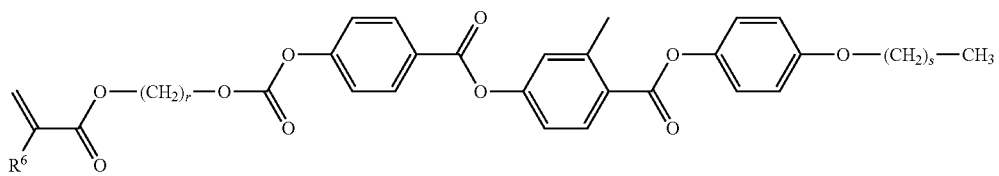
[Chem. 19]
(1-2-8)
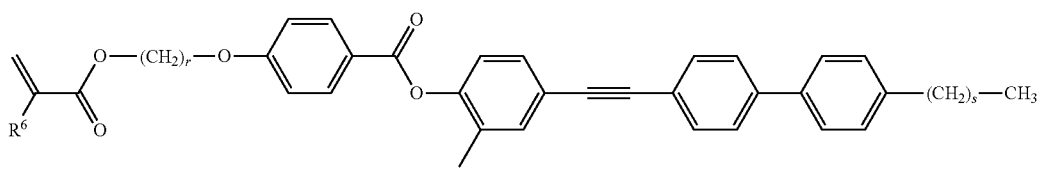
[Chem. 20]
(1-2-9)
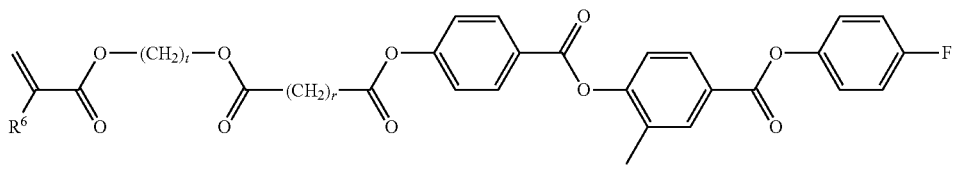
[Chem. 21]
(1-2-10)
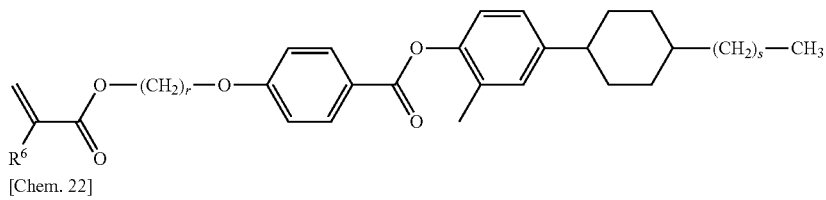
[Chem. 22]
(1-2-11)
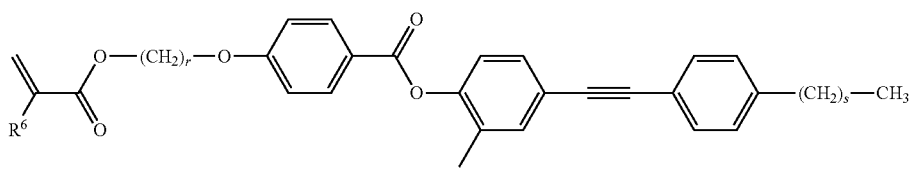

(wherein t represents an integer of 1 to 18, r represents an integer of 1 to 18, s represents an integer of 0 to 18, and $R^6$ represents a hydrogen atom or a methyl group.) These liquid crystal compounds may be used alone or may be used in a mixture of two or more.

The total content of the compound represented by general formula (1-2) is preferably 0 to 70 mass %, more preferably 10 to 60 mass %, particularly preferably 20 to 60 mass % in the entire polymerizable composition from the viewpoint of compatibility in the form of a solution.

Specifically, the polymerizable compound represented by general formula (1) is preferably a compound represented by formula (1-3).

[Chem. 23]

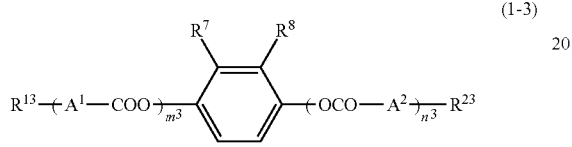

(1-3)

(wherein $R^{13}$, $R^{23}$, $A^1$, $A^2$, $m^3$, and $n^3$ have the same meaning as $R^1$, $R^2$, $A^1$, $A^2$, m, and n as defined in general formula (1) described above, respectively, and one of $R^7$ and $R^8$ represents a hydrogen atom, and the other represents a methyl group.) When at least one polymerizable compound having —COO— and —OCO— as linking groups that connects ring structures having a methyl group is accordingly present, the compound gives good storage stability in the form of a solution and also prevents deposition of solid materials after application of the solution to a base and removal of an organic solvent by a drying process, whereby the liquid crystalline state can be maintained over a long time.

Of the compounds represented by general formula (1-3), compounds in which the ring structures of $A^1$ and $A^2$ have no substituent are preferred in terms of compatibility with other compounds.

The polymerizable composition in the present invention may contain polymerizable compounds other than for the polymerizable compounds represented by general formula (1) described above. Specific examples of the polymerizable compounds include compounds represented by general formula (2)

[Chem. 24]

P—(Sp)$_{m^4}$-MG-R$^9$     (2)

(wherein P represents a polymerizable functional group,

Sp represents a C0 to C18 spacer group, $m^4$ represents 0 or 1 and MG represents a mesogenic group or a mesogenic supporting group, $R^9$ represents a halogen atom, a cyano group, a C1 to C18 alkyl group, or a compound represented by general formula (2-a)

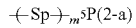 [Chem. 25]

(wherein P represents a reactive functional group, Sp represents a C0 to C18 spacer group, and $m^5$ represents 0 or 1), and the alkyl group may be substituted with at least one halogen atom or CN, and one $CH_2$ group or two or more nonadjacent $CH_2$ groups in this group may be each independently substituted with —O—, —S—, —NH—, —N(CH$_2$)—, —CO—, —COO—, —OCO—, —OCOO—, —SCO—, —COS—, or —C≡C—, as long as oxygen atoms are not directly bonded to each other).

More specific examples of the compounds include compounds represented by general formula (2) where Sp represents an alkylene group, (the alkylene group may be substituted with at least one halogen atom or CN, and one $CH_2$ group or two or more nonadjacent $CH_2$ groups in this group may be each independently substituted with —O—, —S—, —NH—, —N(CH$_2$)—, —CO—, —COO—, —OCO—, —OCOO—, —SCO—, —COS—, or —C≡C—, as long as oxygen atoms are not directly bonded to each other) and MG is represented by general formula (2-b)

[Chem. 26]

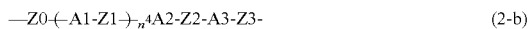  (2-b)

(wherein A1, A2, and A3 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronapthalene-2,6-diyl group, a pyridine-2,5-diyl group, a pyrimidine-2,5-diyl group, a pyrazine-2,5-diyl group, a thiophene-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group, and may have, as a substituent, at least one of F, Cl, $CF_3$, $OCF_3$, a CN group, a C2 to C8 alkyl group, an alkoxy group, an alkanoyl group, an alkanoyloxy group, a C2 to C8 alkenyl group, an alkenyloxy group, an alkenoyl group, and an alkenoyloxy group, Z0, Z1, Z2, and Z3 each independently represent —COO—, —OCO—, —CH$_2$CH$_2$—, —OCH$_2$—, —CH$_2$O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO—, a C2 to C10 alkyl group that may have a halogen atom, or a single bond, and $n^4$ represents 0, 1, or 2).

The polymerizable functional group is preferably a vinyl group, a vinyl ether group, an acrylic group, a (meth)acrylic group, a glycidyl group, an oxetanyl group, a maleimide group, and a thiol group, and particularly preferably a vinyl ether group, an acrylic group, a (meth)acrylic group, or a glycidyl group from the viewpoint of productivity.

Of the compounds represented by general formula (2), compounds in which the ring structures in MG have no substituent are preferred in terms of compatibility with other compounds.

Furthermore, preferred are compounds represented by general formula (2-1)

[Chem. 27]

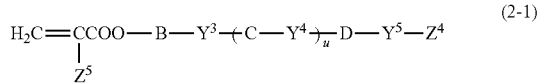
(2-1)

(wherein $Z^4$ represents a hydrogen atom, a halogen atom, a cyano group, or a C1 to C18 hydrocarbon group, $Z^5$ represents a hydrogen atom or a methyl group, and u represents 0 or 1, B, C, and D each independently represent a 1,4-phenylene group, a 1,4-phenylene group in which nonadjacent CH groups are substituted with nitrogen, a 1,4-cyclohexylene group, a 1,4-cyclohexylene group in which one $CH_2$ group or two nonadjacent $CH_2$ groups are substituted with an oxygen or sulfur atom, a 1,4-cyclohexenyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, or a 1,4-naphthylene group, and these groups may be substituted with at least one of a C2 to C7 alkyl group, an alkoxy group, an alkanoyl group, a cyano group, and a halogen atom, $Y^3$ and $Y^4$ each independently represent a single bond, —$CH_2CH_2$—, —$CH_2O$—, —$OCH_2$—, —COO—, —OCO—, —C≡C—, —CH=CH—, —CF=CF—, —$(CH_2)_4$—, —$CH_2CH_2CH_2O$—, —$OCH_2CH_2CH_2$—, —CH=$CHCH_2CH_2$—, —$CH_2CH_2$CH=CH—, —CH=CHCOO—, —OCOCH=CH—, —$CH_2CH_2$COO—, —$CH_2CH_2$OCO—, —COO$CH_2CH_2$—, or —OCO$CH_2CH_2$—, $Y^5$ represents a single bond, —O—, —COO—, —OCO—, or —CH=CHCOO—); and compounds represented by general formula (2-2)

[Chem. 28]

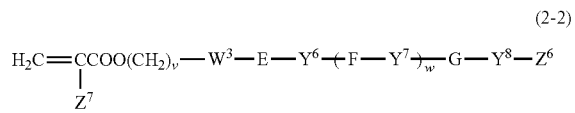
(2-2)

(wherein $Z^6$ represents a hydrogen atom, a halogen atom, a cyano group, or a C1 to C18 hydrocarbon group, $Z^7$ represents a hydrogen atom or a methyl group, $W^3$ represents a single bond, —O—, —OCO—, or —OCO—, v represents an integer of 1 to 18, w represents 0 or 1, E, F, and G each independently represent a 1,4-phenylene group, a 1,4-phenylene group in which nonadjacent CH groups are substituted with nitrogen atoms, a 1,4-cyclohexylene group, a 1,4-cyclohexylene group in which one $CH_2$ group or two nonadjacent $CH_2$ groups are substituted with an oxygen atom or a sulfur atom, a 1,4-cyclohexenyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, or a 1,4-naphthylene group, and these groups may be substituted with at least one of a C2 to C7 alkyl group, an alkoxy group, an alkanoyl group, a cyano group, and a halogen atom, $Y^6$ and $Y^7$ each independently represent a single bond, —$CH_2CH_2$—, —$CH_2O$—, —$OCH_2$—, —OCO—, —OCO—, —C≡C—, —CH=CH—, —CF=CF—, —$(CH_2)_4$—, —$CH_2CH_2CH_2O$—, —$OCH_2CH_2CH_2$—, —CH=$CHCH_2CH_2$—, —$CH_2CH_2$CH=CH—, —CH=CHCOO—, —OCOCH=CH—, —$CH_2CH_2$COO—, —$CH_2CH_2$OCO—, —COO$CH_2CH_2$—, or —OCO$CH_2CH_2$—, $Y^8$ represents a single bond, —O—, —OCO—, —OCO—, or —CH=CHCOO—); and compounds represented by general formula (2-3)

[Chem. 29]

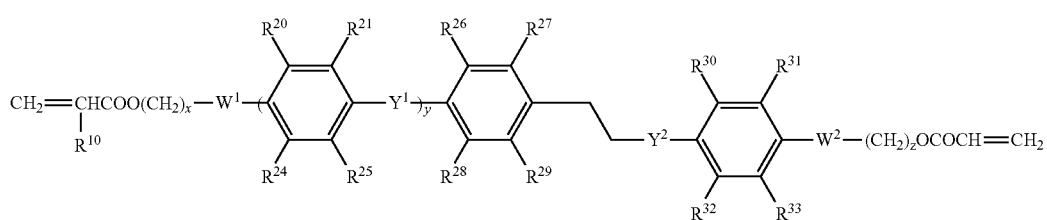
(2-3)

(wherein y represents 0 or 1, $W^1$ and $W^2$ each independently represent a single bond, —O—, —COO—, or —OCO—, $Y^1$ and $Y^2$ each independently represent —C≡C—OCO—, —OCO—C≡C—, —COO—, or —OCO—, x and z each independently represent an integer of 0 to 18, $R^{10}$ represents a hydrogen atom or a methyl group, $R^{20}$, $R^{21}$, and $R^{24}$ to $R^{33}$ are each selected from a hydrogen atom, a C2 to C7 alkyl group, an alkoxy group, an alkanoyl groups, a cyano group, or a halogen atom).

Examples of the compounds include, but are not limited to, the compounds described below.

[Chem. 30]
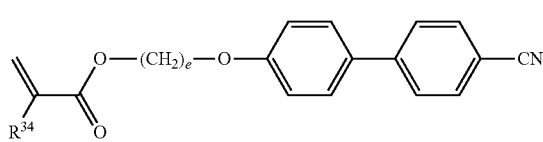
(2-4)
[Chem. 31]
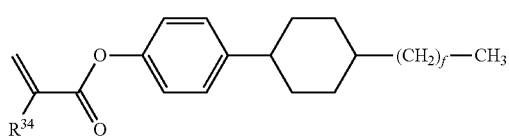
(2-5)
[Chem. 32]
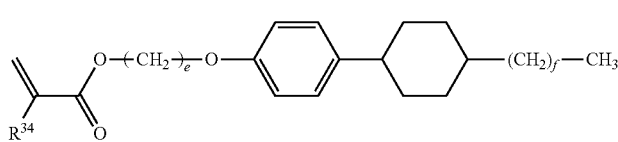
(2-6)
[Chem. 33]
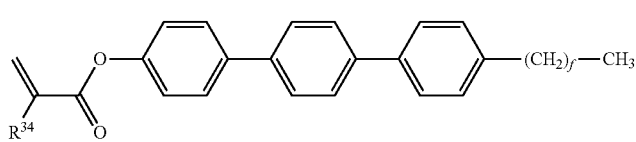
(2-7)
[Chem. 34]
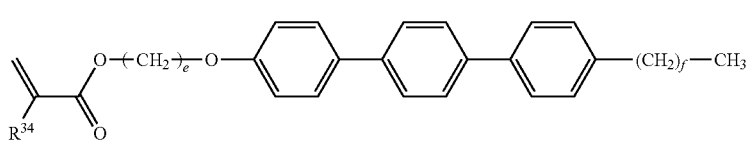
(2-8)
[Chem. 35]
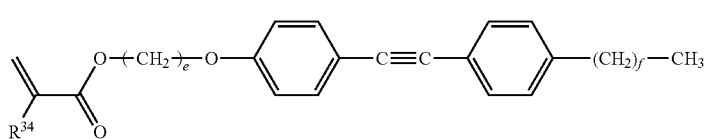
(2-9)
[Chem. 36]
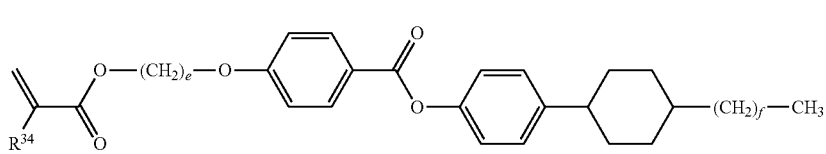
(2-10)
[Chem. 37]
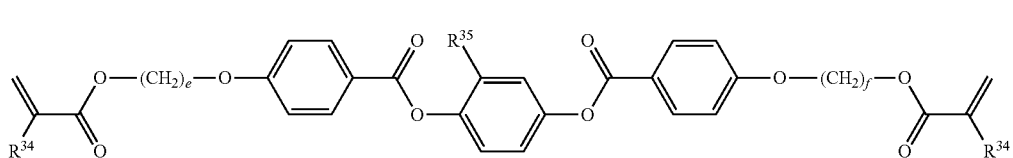
(2-11)

[Chem. 38]

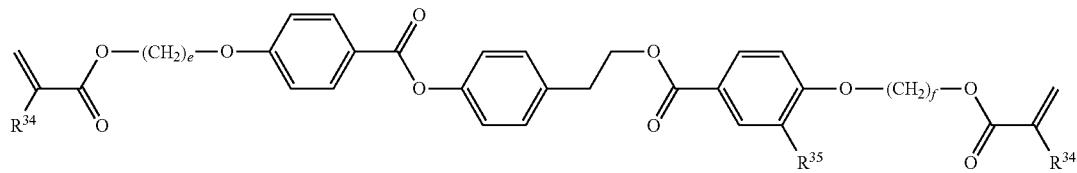

(2-12)

[Chem. 39]

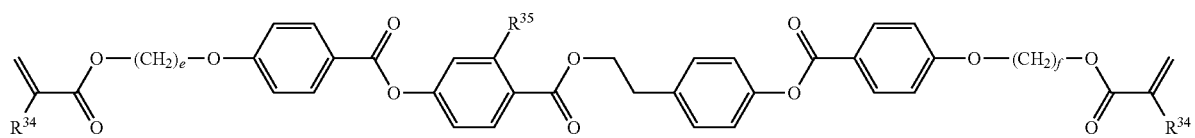

(2-13)

(wherein e and f each independently represent an integer of 1 to 18, $R^{34}$ represents a hydrogen atom or a methyl group, and $R^{35}$ represents a hydrogen atom, a halogen atom, a C2 to C6 alkyl group, a C1 to C6 alkoxy group, and a cyano group. When $R^{35}$ represents a C2 to C6 alkyl group or a C1 to C6 alkoxy group, $R^{35}$ may have no substituent or may be substituted with one or more halogen atoms.) These compounds may be used alone or may be used in a mixture of two or more.

The total content of the compound represented by general formula (2) is preferably 0 to 10 mass % in the entire polymerizable composition from the viewpoint of compatibility in the form of a solution.

The polymerizable composition solution according to the present invention may exhibit liquid crystallinity except for that of the polymerizable compounds represented by general formula (1) or may also contain a polymerizable chiral compound that may have no liquid crystallinity.

The polymerizable chiral compound used in the present invention preferably has at least one polymerizable functional group. Examples of such compounds include polymerizable chiral compounds containing chiral sugars, such as isosorbide, isomannite, and glucoside, and also having a rigid moiety, such as a 1,4-phenylene group, a 1,4-cyclohexlene group, and a polymerizable functional group, such as a vinyl group, an acryloyl group, a (meth)acryloyl group, and a maleimide group, as described in Japanese Unexamined Patent Application Publication Nos. 11-193287, 2001-158788, 2007-269639, 2007-269640, and 2009-84178, and Japanese Unexamined Patent Application Publication (Translation of PCT Application) No. 2006-52669; a polymerizable chiral compound formed of a terpenoid derivative as described in Japanese Unexamined Patent Application Publication No. 8-239666; polymerizable chiral compounds having a spacer with a mesogenic group and a chiral moiety, as described in, for example, NATURE VOL. 35, 467 to 469 pages (issued on Nov. 30, 1995) and NATURE VOL. 392, 476 to 479 pages (issued on Apr. 2, 1998); and polymerizable chiral compounds containing a binaphthyl group, as described in Japanese Unexamined Patent Application Publication (Translation of PCT Application) No. 2004-504285 and Japanese Unexamined Patent Application Publication No. 2007-248945. Of these, chiral compounds with large helical twisting power (HTP) are preferred as the polymerizable liquid crystal composition of the present invention.

The proportion of the polymerizable chiral compound added needs to be appropriately controlled according to the helical twisting power of the compound, and preferably 0 to 10 mass % in the polymerizable composition.

Examples of general formulas of the polymerizable chiral compounds include, but are not limited to, general formulas (3-1) to (3-4) described below.

[Chem. 40]

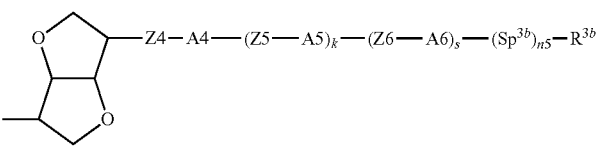

(3-1)

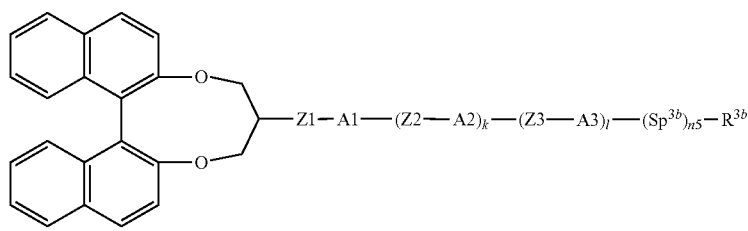

(3-2)

-continued

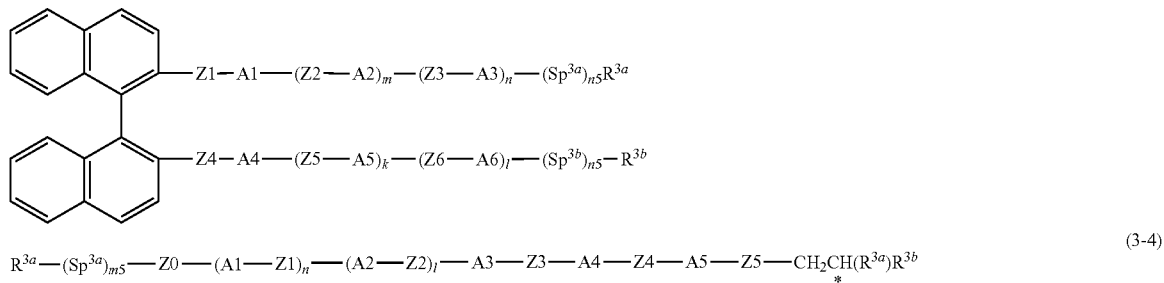

(3-3)

$$R^{3a}-(Sp^{3a})_{m5}-Z0-(A1-Z1)_n-(A2-Z2)_l-A3-Z3-A4-Z4-A5-Z5-\underset{*}{C}H_2CH(R^{3a})R^{3b}$$

(3-4)

wherein $Sp^{3a}$ and $Sp^{3b}$ each independently represent a CO to C18 alkylene group, and the alkylene group may be substituted with at least one halogen atom, CN group, or C1 to C8 alkyl group having a polymerizable functional group, and one $CH_2$ group or two or more nonadjacent $CH_2$ groups in the alkylene group may be each independently substituted with —O—, —S—, —NH—, —N($CH_3$)—, —CO—, —COO—, —OCO—, —OCOO—, —SCO—, —COS—, or —C≡C—, as long as oxygen atoms are not directly bonded to each other, A1, A2, A3, A4, and A5 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronapthalene-2,6-diyl group, a pyridine-2,5-diyl group, a pyrimidine-2,5-diyl group, a pyrazine-2,5-diyl group, a thiophene-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group, and n, 1, and k each independently represent 0 or 1, and 0≤n+1+k≤3, Z0, Z1, Z2, Z3, Z4, Z5, and Z6 each independently represent —COO—, —OCO—, —$CH_2CH_2$—, —$OCH_2$—, —$CH_2O$—, —CH=CH—, —C≡C—, —CH=CHCOO—, —OCOCH=CH—, —$CH_2CH_2COO$—, —$CH_2CH_2OCO$—, —$COOCH_2CH_2$—, —$OCOCH_2CH_2$—, —CONH—, —NHCO—, a C2 to C10 alkyl group that may have a halogen atom, or a single bond, and n5 and m5 each independently represent 0 or 1, $R^{3a}$ and $R^{3b}$ represent a hydrogen atom, a halogen atom, a cyano group, and a C1 to C18 alkyl group, and the alkyl group may be substituted with at least one halogen atom or CN, and one $CH_2$ group or two or more nonadjacent $CH_2$ groups in the alkyl group may be each independently substituted with —O—, —S—, —NH—, —N($CH_2$)—, —CO—, —COO—, —OCO—, —OCOO—, —SCO—, —COS—, or —C≡C—, as long as oxygen atoms are not directly bonded to each other, alternatively, $R^{3a}$ and $R^{3b}$ are represented by general formula (3-a)

[Chem. 41]

—$P^{3a}$ (3-a)

(wherein $P^{3a}$ represents a polymerizable functional group, and $Sp^{3a}$ has the same meaning as $Sp^1$).

$P^{5a}$ preferably represents a substituent selected from polymerizable groups represented by formulas (P-1) to (P-20) described below.

[Chem. 42]

(P-1)

(P-2)

(P-3)

(P-4)

(P-5)

(P-6)

(P-7)

(P-8)

(P-9)

(P-10)

(P-11)

-continued

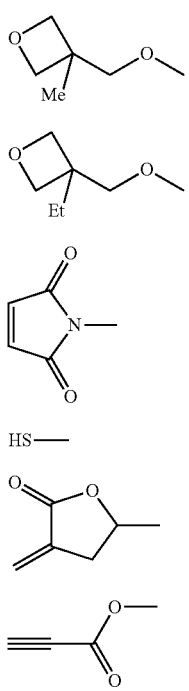

(P-12)
(P-13)
(P-14)
(P-15)
(P-16)
(P-17)

-continued

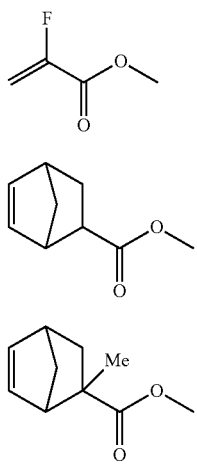

(P-18)
(P-19)
(P-20)

Of these polymerizable functional groups, the group represented by formula (P-1) or formula (P-2), (P-7), (P-12), or (P-13) is preferred, and the group represented by formula (P-1), (P-7), or (P-12) is more preferred in order to improve polymerizability and storage stability.

Specific examples of polymerizable chiral compounds include, but are not limited to, compounds (3-5) to (3-25) described below.

[Chem. 43]

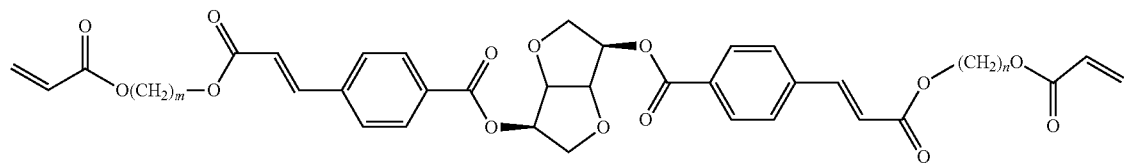

(3-5)

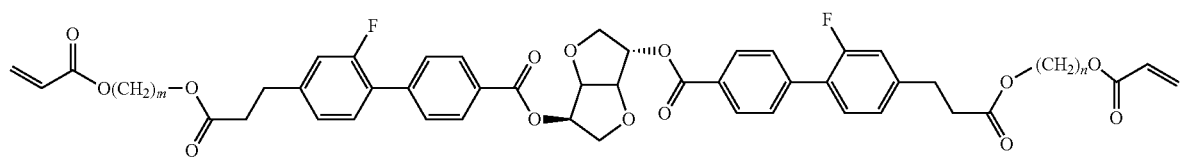

(3-6)

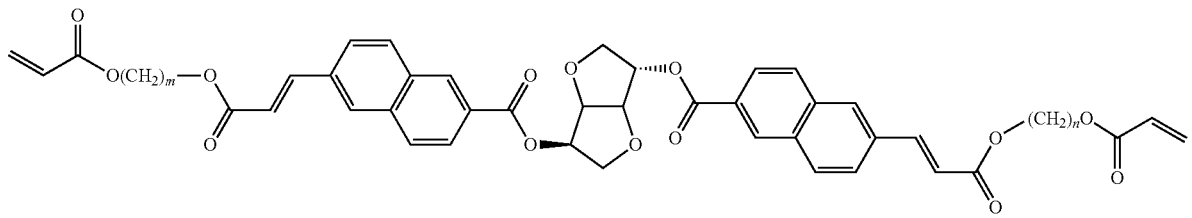

(3-7)

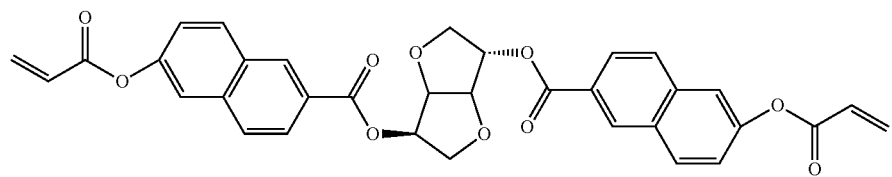

(3-8)

-continued
(3-9)
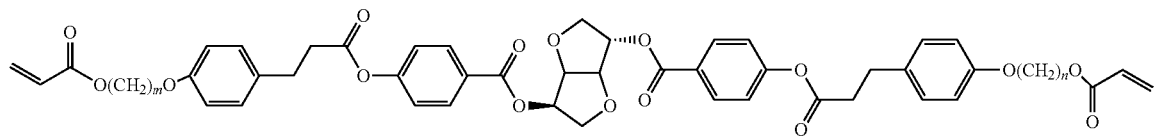
(3-10)
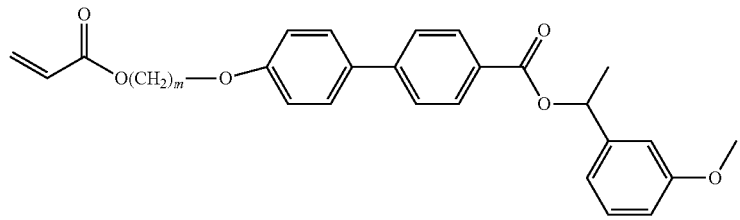
(3-11)
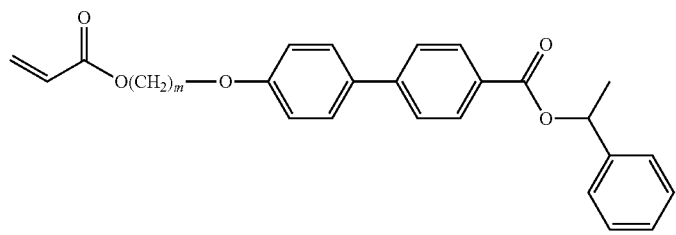
(3-12)
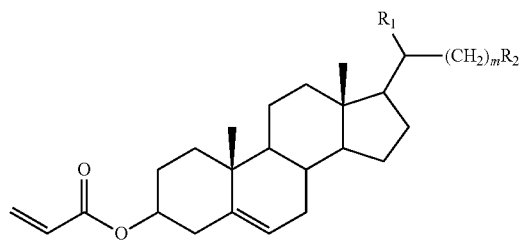
(3-13)
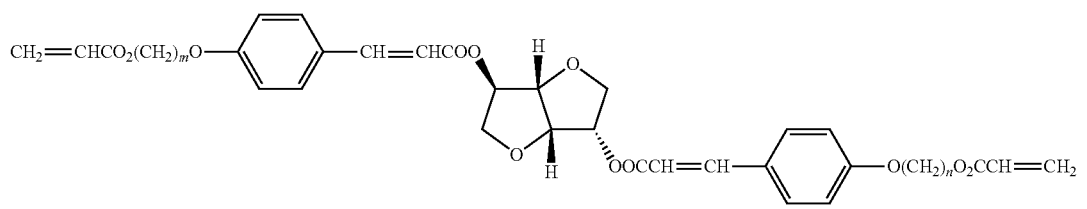
[Chem. 44]
(3-14)
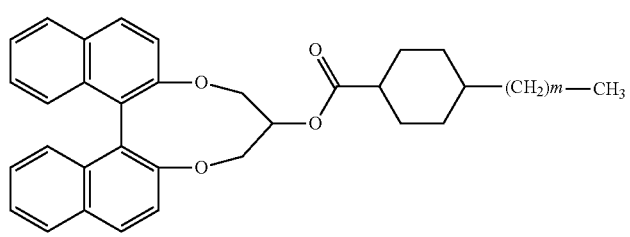

-continued
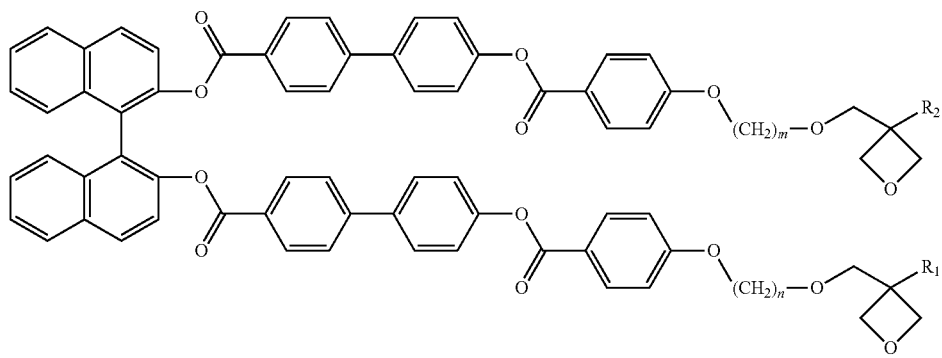
(3-15)
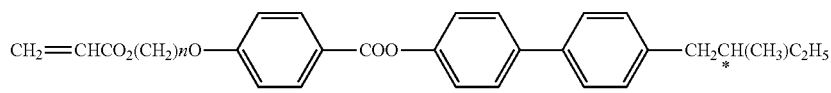
(3-16)
[Chem. 45]
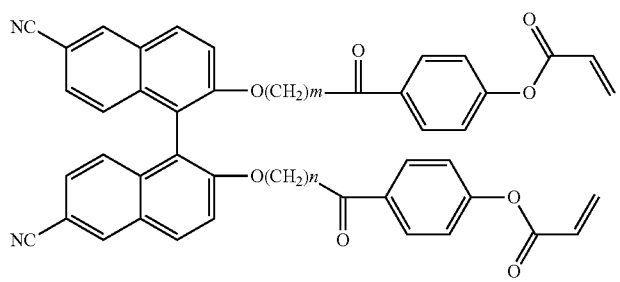
(3-17)
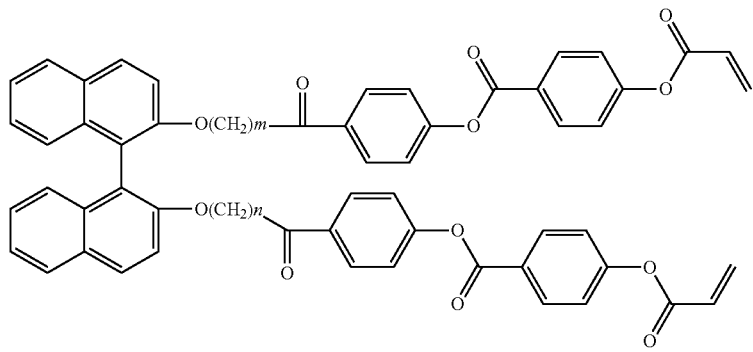
(3-18)
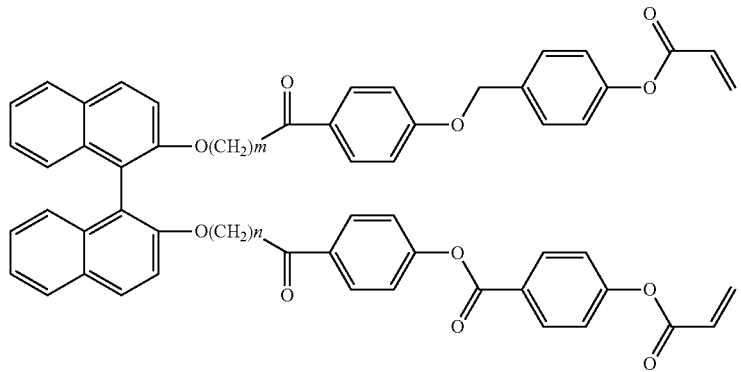
(3-19)

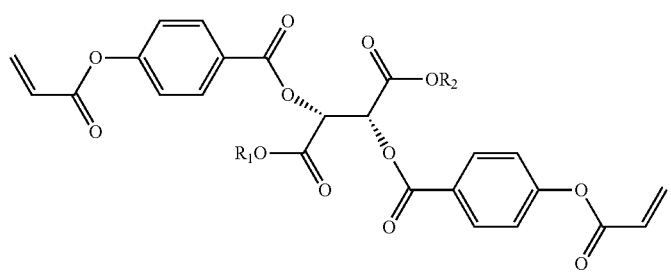
(3-20)
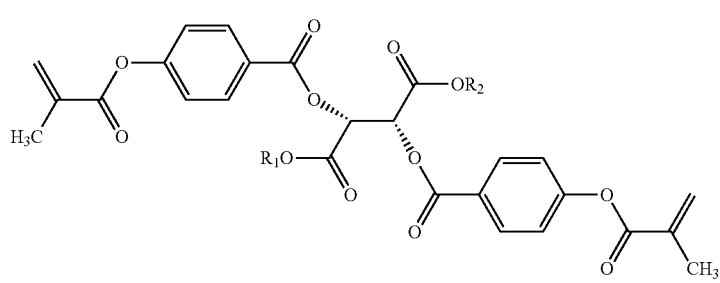
(3-21)
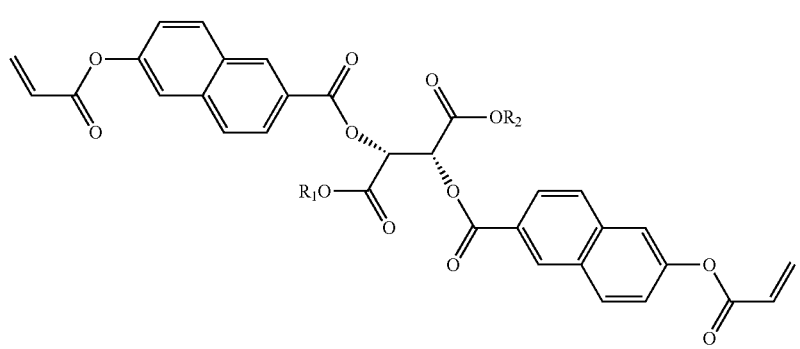
(3-22)
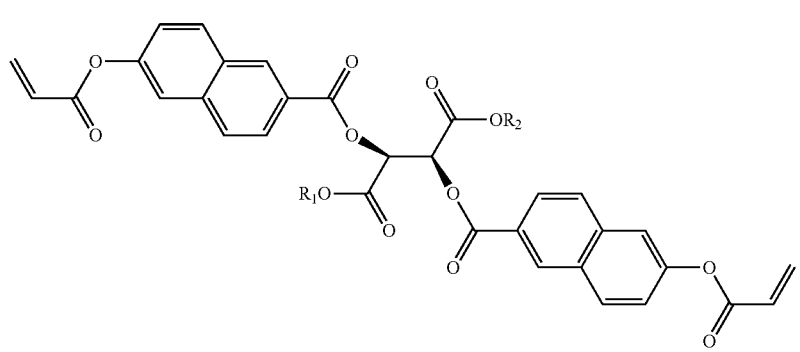
(3-23)
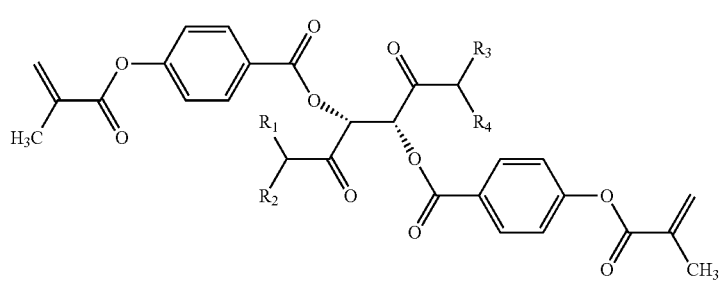
(3-24)

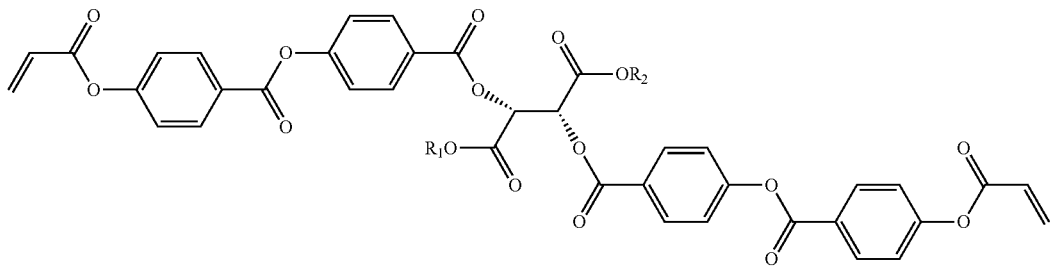

(3-25)

wherein m, n, k, and l each independently represent an integer of 1 to 18, $R_1$ to $R_4$ each independently represent a hydrogen atom, a C1 to C6 alkyl group, a C1 to C6 alkoxy group, a carboxyl group, and a cyano group. When these groups are C1 to C6 alkyl groups or C1 to C6 alkoxy groups, these groups all may have no substituent or may be substituted with one or more halogen atoms.

The polymerizable composition solution according to the present invention may exhibit liquid crystallinity except for that of the polymerizable compounds represented by general formula (1) described above and may also contain a polymerizable discotic compound that may have no liquid crystallinity.

The polymerizable discotic compound used in the present invention preferably has at least one polymerizable functional group. Examples of such compounds include polymerizable compounds as described in Japanese Unexamined Patent Application Publication Nos. 7-281028, 7-287120, 7-333431, and 8-27284.

The proportion of the polymerizable discotic compound added needs to be appropriately controlled depending on the compound, and preferably 0 to 10 mass % in the polymerizable composition.

Examples of general formulas of the polymerizable discotic compounds include, but are not limited to, general formulas (4-1) to (4-3) described below.

[Chem. 47]

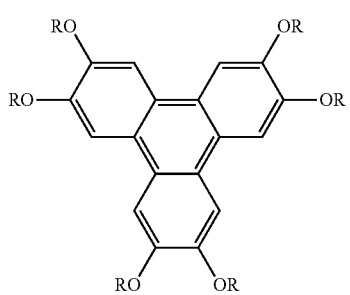

(4-1)

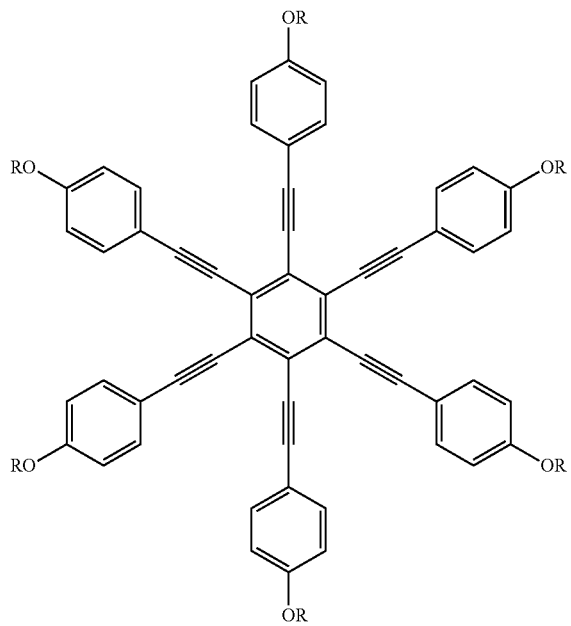

(4-2)

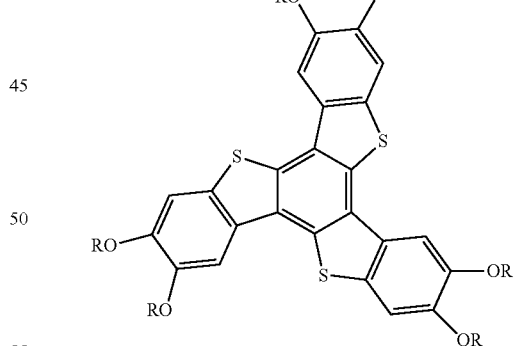

(4-3)

R: —$Z^{4a}$—$(A^4$—$Z^{4b})_{n4}$—$Sp^4$—$R^4$ wherein $Sp^4$ represents a C0 to C18 alkylene group, and the alkylene group may be substituted with at least one halogen atom, CN group, or C1 to C8 alkyl group having a polymerizable functional group, and one $CH_2$ group or two or more nonadjacent $CH_2$ groups in the alkylene group may be each independently substituted with —O—, —S—, —NH—, —N($CH_3$)—, —CO—, —COO—, —OCO—, —OCOO—, —SCO—, —COS—, or —C≡C—, as long as oxygen atoms are not directly bonded to each other, $A^4$ represents a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronapthalene-2,6-diyl group, a pyridine-2,5-diyl group, a pyrimidine-2,5-diyl group, a pyrazine-2,5-diyl group, a thiophene-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group, n5 represents 0 or 1, $Z^{4a}$ represents —CO—, —CH$_2$CH$_2$—, —CH$_2$O—, —CH=CH—, —CH=CHCOO—, —CH$_2$CH$_2$COO—, —CH$_2$CH$_2$OCO—, —COCH$_2$CH$_2$—, a C2 to C10 alkyl group that may have a halogen atom, or a single bond, $Z^{4b}$ represents —OCO—, —OCO—, —OCH$_2$—, —CH$_2$O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO—, —OCOO—, a C2 to C10 alkyl group that may have a halogen atom, or a single bond, and $R^4$ represents a hydrogen atom, a halogen atom, a cyano group, and a C1 to C18 alkyl group, and the alkyl group may be substituted with at least one halogen atom or CN, and one CH$_2$ group or two or more nonadjacent CH$_2$ groups in the alkyl group may be each independently substituted with —O—, —S—, —NH—, —N(CH$_3$)—, —CO—, —COO—, —OCO—, —OCOO—, —SCO—, —COS—, or —C≡C—, as long as oxygen atoms are not directly bonded to each other, alternatively, $R^4$ is represented by general formula (4-a)

[Chem. 48]

—P$^{4a}$ (4-a)

(wherein $P^{4a}$ represents a polymerizable functional group, and $Sp^{3a}$ has the same meaning as $Sp^1$).

$P^{4a}$ preferably represents a substituent selected from polymerizable groups represented by formulas (P-1) to formula (P-20) described below.

[Chem. 49]

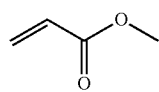 (P-1)

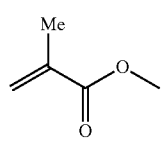 (P-2)

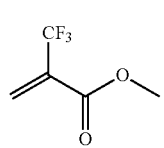 (P-3)

-continued

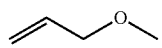 (P-4)

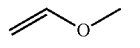 (P-5)

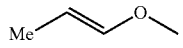 (P-6)

 (P-7)

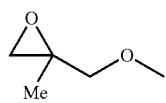 (P-8)

 (P-9)

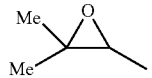 (P-10)

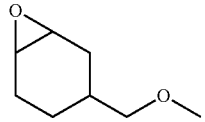 (P-11)

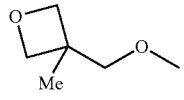 (P-12)

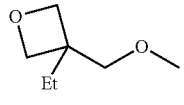 (P-13)

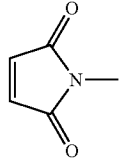 (P-14)

 (P-15)

HS—

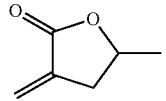 (P-16)

-continued

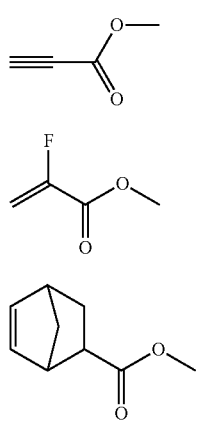

(P-17)

(P-18)

(P-19)

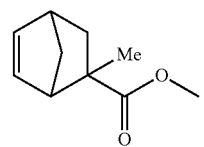

(P-20)

Of these polymerizable functional groups, the group represented by formula (P-1), (P-2), (P-7), (P-12), or (P-13) is preferred, and the group represented by formula (P-1), (P-7), or (P-12) is more preferred in order to improve polymerizability and storage stability. Specific examples of the polymerizable discotic compounds include, but are not limited to, compounds (4-4) to (4-8) described below.

[Chem. 50]

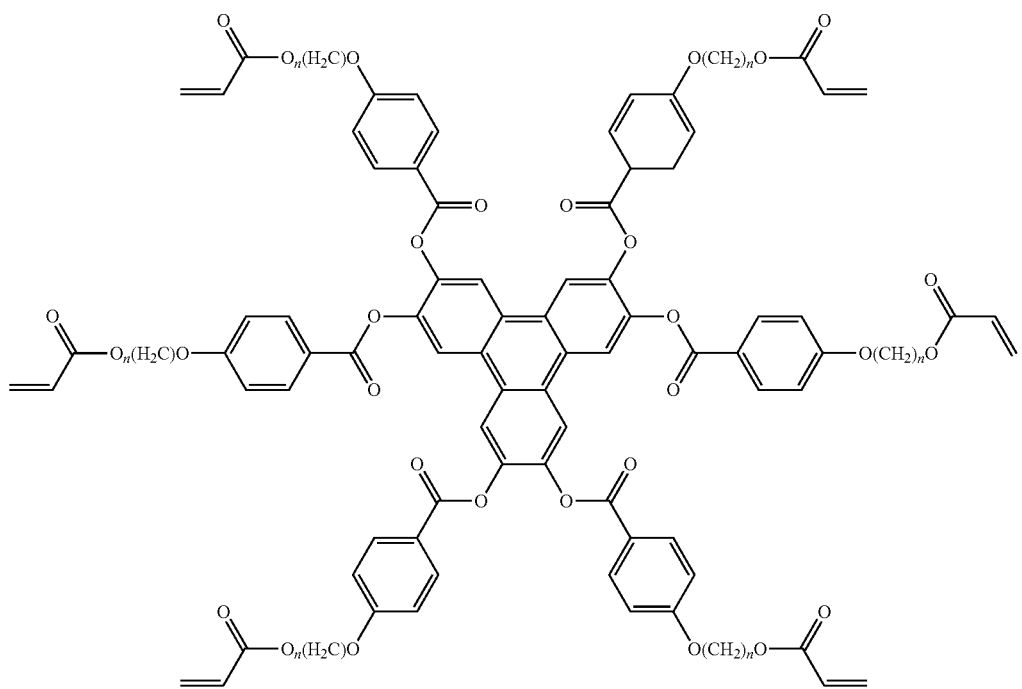

(4-4)

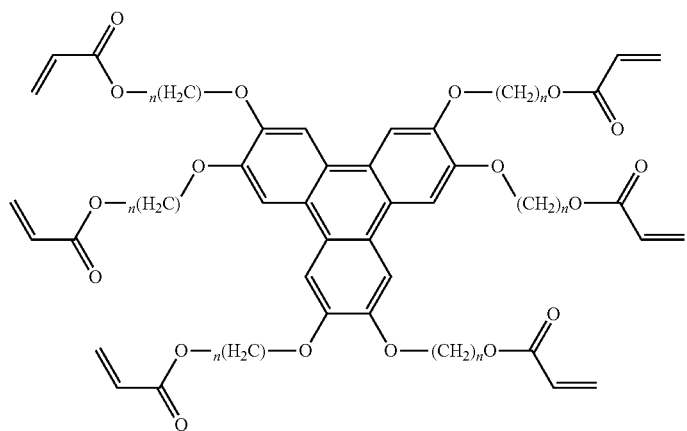

(4-5)

[Chem. 51]
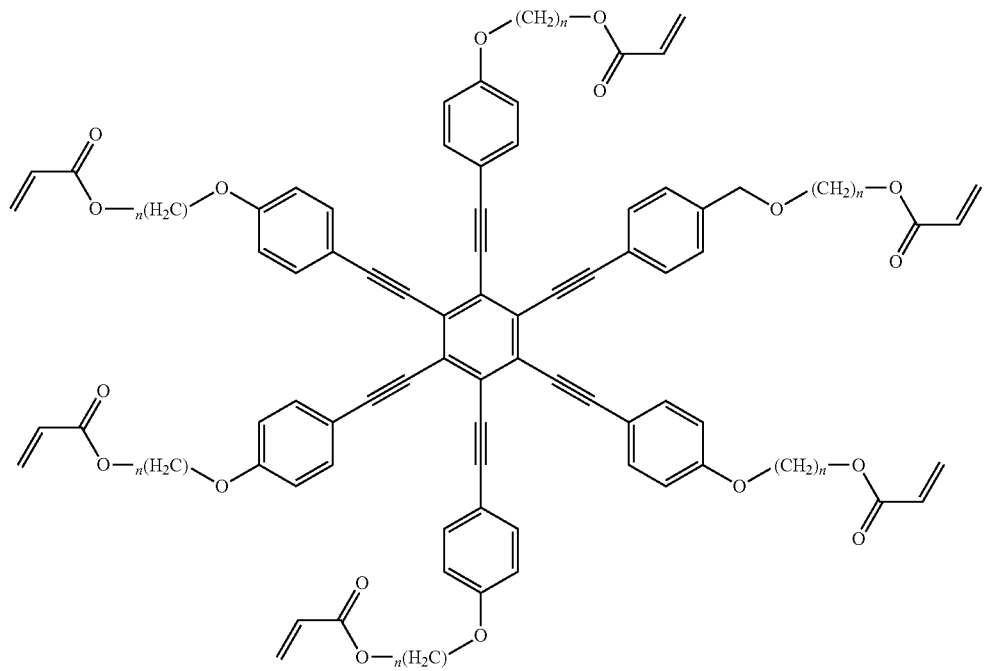
(4-6)
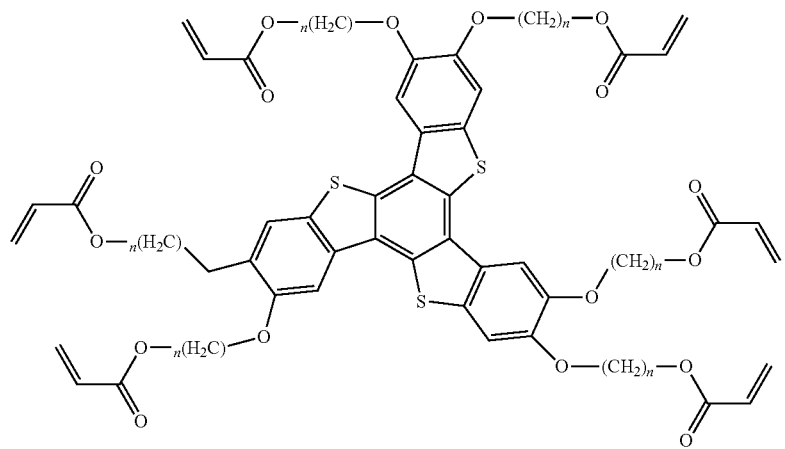
(4-7)

[Chem. 52]

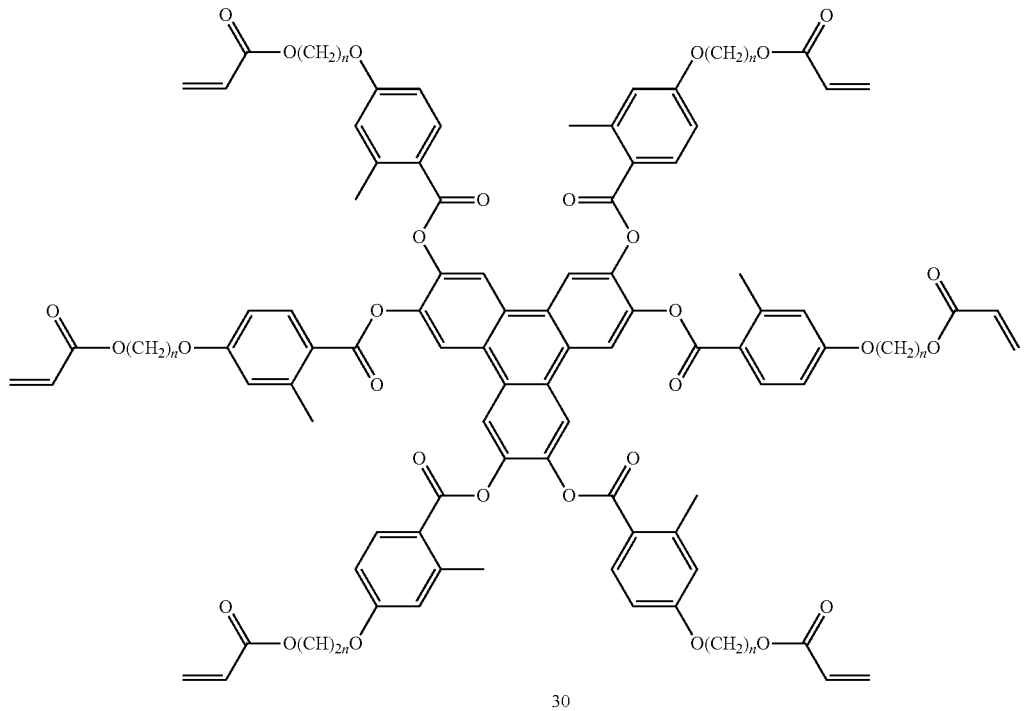

(4-8)

In the formula, n represents an integer of 1 to 18.

(Organic Solvent)

Organic solvents used in the polymerizable composition solution according to the present invention are preferably, but not necessarily, solvents that dissolve polymerizable compounds well and can be dried at temperatures of 100° C. or less. Examples of such solvents include aromatic hydrocarbons, such as toluene, xylene, cumene, and mesitylene; ester solvents, such as methyl acetate, ethyl acetate, propyl acetate, and butyl acetate; ketone solvents, such as methyl ethyl ketone, methyl isobutyl ketone, cyclohexanone, and cyclopentanone; ether solvents, such as tetrahydrofuran, 1,2-dimethoxyethane, and anisole; amide solvents, such as N,N-dimethylformamide and N-methyl-2-pyrrolidone; and propylene glycol monomethyl ether acetate, diethylene glycol monomethyl ether acetate, γ-butyrolactone, and chlorobenzene. These may be used alone or may be used in a mixture of two or more. At least one of ketone solvents, ether solvents, ester solvents, and aromatic hydrocarbon solvents is preferably used. When two solvents are used in mixture, toluene and propylene glycol monomethyl ether acetate are preferably used in mixture in terms of solution stability.

With regard to the proportion of the organic solvent in the polymerizable composition solution, the solid content of the polymerizable composition used in the present invention is preferably, but not necessarily, 10 to 60 mass %, more preferably 20 to 50 mass % without significantly impairing the coating conditions of the polymerizable composition, which is typically applied by coating.

(Polymerization Initiator)

The polymerizable composition solution according to the present invention preferably contains at least one polymerization initiator. The polymerization initiator is preferably a photopolymerization initiator. Specific examples of the photopolymerization initiator include "Irgacure 651", "Irgacure 184", "Irgacure 907", "Irgacure 127", "Irgacure 369", "Irgacure 379", "Irgacure 819", "Irgacure OXE 01", "Irgacure OXE 02", "Lucirin TPO", and "Darocur 1173" availavle from BASF; and "Esacure 1001 M", "Esacure KIP 150", "Speedcure BEM", "Speedcure BMS", "Speedcure PBZ", and "benzophenone" available from LAMBSON.

The amount of the photopolymerization initiator used is preferably 0.1 to 10 mass %, particularly preferably 0.5 to 5 mass % with respect to the polymerizable composition. These may be used alone or may be used in a mixture of two or more. Furthermore, a sensitizer or the like may be added.

(Surfactant)

The polymerizable composition solution according to the present invention preferably contains at least one surfactant in order to reduce film thickness unevenness when the polymerizable composition solution is used in an optically anisotropic body. Examples of the surfactant that can be added include alkyl carboxylates, alkyl phosphates, alkyl sulfonates, fluoroalkyl carboxylates, fluoroalkyl phosphates, fluoroalkyl sulfonates, polyoxyethylene derivatives, fluoroalkyl ethylene oxide derivatives, polyethylene glycol derivatives, alkyl ammonium salts, fluoroalkyl ammonium salts, and silicone derivatives, with fluorine-containing surfactants and silicone derivatives particularly preferred. Specific examples of the surfactant include "MEGAFAC F-110", "MEGAFAC F-113", "MEGAFAC F-120", "MEGAFAC F-812", "MEGAFAC F-142D", "MEGAFAC F-144D", "MEGAFAC F-150", "MEGAFAC F-171", "MEGAFAC F-173", "MEGAFAC F-177", "MEGAFAC F-183", "MEGAFAC F-195", "MEGAFAC F-824", "MEGAFAC F-833", "MEGAFAC F-114", "MEGAFAC F-410", "MEGAFAC F-493", "MEGAFAC F-494", "MEGAFAC F-443", "MEGAFAC F-444", "MEGAFAC F-445", "MEGAFAC F-446", "MEGAFAC F-470", "MEGAFAC F-471", "MEGAFAC F-474", "MEGAFAC F-475", "MEGAFAC F-477", "MEGAFAC F-478", "MEGAFAC F-479", "MEGAFAC F-480SF", "MEGAFAC F-482", "MEGAFAC F-483", "MEGAFAC F-484", "MEGAFAC F-486", "MEGAFAC F-487", "MEGAFAC F-489", "MEGAFAC F-554", "MEGAFAC F-172D", "MEGAFAC "F-178K", "MEGAFAC F-178RM", "MEGAFAC R-08", "MEGAFAC R-30", "MEGAFAC F-472SF", "MEGAFAC BL-20", "MEGAFAC R-61", "MEGAFAC R-90", "MEGAFAC ESM-1", and "MEGAFAC MCF-350SF" (available from DIC Corporation);

"Ftergent 100", "Ftergent 100C", "Ftergent 110", "Ftergent 150", "Ftergent 150CH", "Ftergent A" "Ftergent 100 A-K", "Ftergent 501", "Ftergent 300", "Ftergent 310", "Ftergent 320", "Ftergent 400SW", "FTX-400P", "Ftergent 251", "Ftergent 215M", "Ftergent 212MH", "Ftergent 250", "Ftergent 222F", "Ftergent 212D", "FTX-218", "FTX-209F", "FTX-213F", "FTX-233F", "Ftergent 245F", "FTX-208G", "FTX-240G", "FTX-206D", "FTX-220D", "FTX-230D", "FTX-240D", "FTX-207S", "FTX-211S", "FTX-220S", "FTX-230S", "FTX-750FM", "FTX-730FM", "FTX-730FL", "FTX-710FS", "FTX-710FM", "FTX-710FL", "FTX-750LL", "FTX-730LS", "FTX-730LM", "FTX-730LL", and "FTX-710LL" (available from NEOS Company Limited);

"BYK-300", "BYK-302", "BYK-306", "BYK-307", "BYK-310", "BYK-315", "BYK-320", "BYK-322", "BYK-323", "BYK-325", "BYK-330", "BYK-331", "BYK-333", "BYK-337", "BYK-340", "BYK-344", "BYK-370", "BYK-375", "BYK-377", "BYK-350", "BYK-352", "BYK-354", "BYK-355", "BYK-356", "BYK-358 N", "BYK-361 N", "BYK-357", "BYK-390", "BYK-392", "BYK-UV 3500", "BYK-UV 3510", "BYK-UV 3570", and "BYK-Silclean 3700" (available from BYK Japan KK);

"TEGO Rad 2100", "TEGO Rad 2200N", "TEGO Rad 2250", "TEGO Rad 2300", "TEGO Rad 2500", "TEGO Rad 2600", and "TEGO Rad 2700" (available from TEGO); and "N215", "N535", "N605K", and "N935" (available from Solvay Solexis, Inc).

The amount of the surfactant added is preferably 0.01 to 2 mass %, more preferably 0.05 to 0.5 mass % with respect to the polymerizable composition.

g) (Other Components)

The polymerizable composition solution according to the present invention preferably contains at least one compound having a weight-average molecular weight of 100 or more and having a repeating unit represented by general formula (5) described below, in order to effectively reduce the tilt angle of the air interface when the polymerizable composition solution is used in an optically anisotropic body.

[Chem. 53]

$$-(CR^{36}R^{37}-CR^{38}R^{39})- \quad (5)$$

(wherein, $R^{36}$, $R^{37}$, $R^{38}$, and $R^{39}$ each independently represent a hydrogen atom, a halogen atom, or a C1 to C20 hydrocarbon group, and the hydrogen atoms in the hydrocarbon group may be substituted with one or more halogen atoms.)

Examples of suitable compounds represented by general formula (5) include polyethylene, polypropylene, polyisobutylene, paraffin, liquid paraffin, chlorinated polypropylene, chlorinated paraffin, and chlorinated liquid paraffin.

The amount of the compound represented by general formula (5) added is preferably 0.01 to 1 mass %, more preferably 0.05 to 0.5 mass % with respect to the polymerizable composition.

The polymerizable composition solution according to the present invention preferably contains a chain transfer agent in order to improve the adhesion to a base when the polymerizable composition solution is used in an optically anisotropic body. The chain transfer agent is preferably a thiol compound, more preferably a monothiol, dithiol, trithiol, or tetrathiol compound, still more preferably a trithiol compound. Specific examples of suitable chain transfer agents include compounds represented by general formulas (6-1) to (6-12) described below.

[Chem. 54]

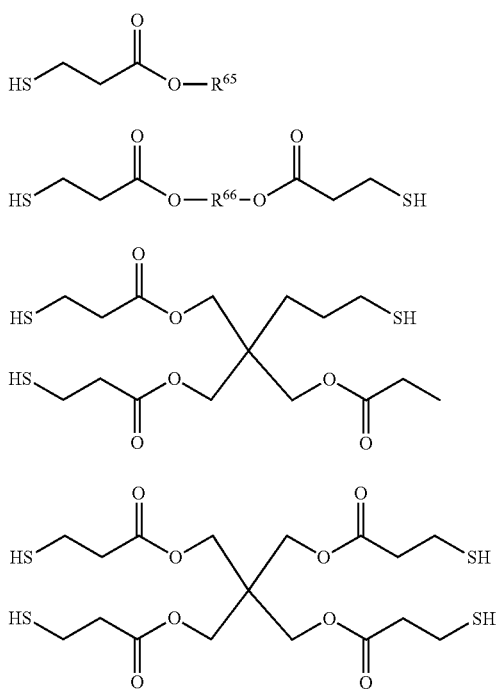

[Chem. 55]

(6-9)

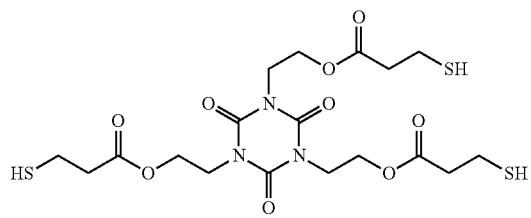

(6-10)

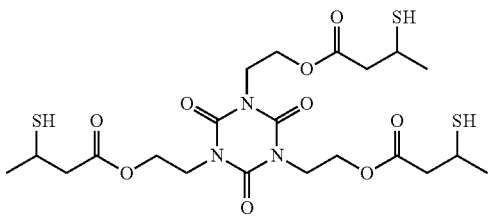

(6-11)

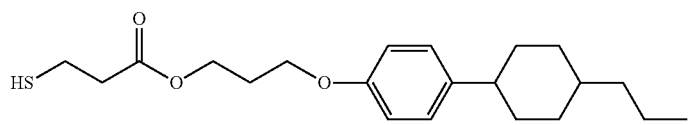

(6-12)

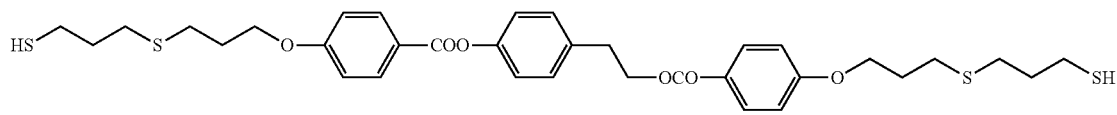

(wherein $R^{65}$ represents a C2 to C18 alkyl group, and the alkyl group may have a straight chain or a branched chain, at least one methylene group in the alkyl group may be substituted with an oxygen atom, a sulfur atom, —CO—, —OCO—, —COO—, or —CH=CH—, as long as oxygen atoms and sulfur atoms are not directly bonded to each other; $R^{66}$ represents a C2 to C18 alkylene group, and at least one methylene group in the alkylene group may be substituted with an oxygen atom, a sulfur atom, —CO—, —OCO—, —COO—, or —CH=CH—, as long as oxygen atoms and sulfur atoms are not directly bonded to each other.)

The amount of the thiol compound added is preferably 0.5 to 10 mass %, more preferably 1.0 to 5.0 mass % with respect to the polymerizable composition.

The polymerizable composition solution according to the present invention preferably contains a polymerization inhibitor, an antioxidant, and/or the like in order to improve solution stability. Examples of such compounds include hydroquinone derivatives and hindered phenolic antioxidants, and specific examples of the compounds include p-methoxyphenol; and "IRGANOX 1010", "IRGANOX 1035", "IRGANOX 1076", "IRGANOX 1098", "IRGANOX 1135", "IRGANOX 1330", "IRGANOX 1425", "IRGANOX 1520", "IRGANOX 1726", "IRGANOX 245", "IRGANOX 259", "IRGANOX 3114", "IRGANOX 3790", "IRGANOX 5057", and "IRGANOX 565" available from BASF.

The amount of the polymerization inhibitor and/or antioxidant added is preferably 0.01 to 1.0 mass %, more preferably 0.05 to 0.5 mass % with respect to the polymerizable composition.

To further control the physical properties of the polymerizable composition solution, for example, a non-polymerizable liquid crystal compound or a non-liquid crystalline polymerizable compound can be added as desired. The amount of these compounds added is preferably 20 mass % or less, more preferably 10 mass % or less, still more preferably 5 mass % or less with respect to the polymerizable composition.

(Method for Producing Optically Anisotropic Body)
(Optically Anisotropic Body)

The optically anisotropic body according to the present invention is a laminate including in sequence a base, an optional alignment film, and a polymer of the polymerizable composition solution. Alternatively, the optically anisotropic body according to the present invention is a laminate including in sequence a base, an optional alignment film, and a polymer of the polymerizable composition solution and further including in sequence an optional alignment film and a polymerizable composition solution that may be the same as or different from the above thereon. In addition, an optional alignment film and a polymerizable composition solution that may be the same as or different from the above can be further laminated in sequence thereon.

The base used in the optically anisotropic body according to the present invention can be any base that is commonly used in liquid crystal devices, displays, optical elements, optical components, coloring agents, security markings, members for laser luminescence, and optical films and that has resistance to heating performed when the polymerizable composition solution according to the present invention is dried after application. Examples of such bases include those formed of glass bases, metal bases, ceramics bases, and organic materials, such as plastic bases. In particular, when the base is formed of organic materials, suitable materials include cellulose derivatives, polyolefin, polyester, polyolefin, polycarbonate, polyacrylate, polyarylate, polyether sulfone, polyimide, polyphenylene sulfide, polyphenylene ether, nylon, and polystyrene. Of these, plastic bases, such as those formed of polyester, polystyrene, polyolefin, cellulose derivatives, polyarylate, and polycarbonate are preferred.

To improve the coating properties and adhesiveness of the polymerizable composition solution according to the present invention, such bases may be subjected to surface treatment. Examples of the surface treatment include an ozone treatment, a plasma treatment, a corona treatment, and a silane coupling treatment. The surface of the base may be provided with, for example, an organic thin film, an inorganic oxide thin film, a metal thin film by deposition or the like in order to adjust the permeability or reflectance of light. Alternatively, the base may be a pickup lens, a rod lens, an optical disc, a retardation film, a light diffusing film, a color filter, or the like in order to add optical value. Of these, a pickup lens, a retardation film, a light diffusing film, and a color filter are preferred to add higher optical value.

The base may be typically subjected to alignment treatment or may be provided with an alignment film in order to align the polymerizable composition after the polymerizable composition solution according to the present invention is applied and dried. Examples of the alignment treatment include a stretching treatment, a rubbing treatment, a polarized ultraviolet visible light irradiation treatment, and an ion beam treatment. When an alignment film is used, any publicly-known alignment film can be used. Examples of such alignment films include those formed of compounds, such as polyimide, polysiloxane, polyamide, polyvinyl alcohol, polycarbonate, polystyrene, polyphenylene ether, polyarylate, polyethylene terephthalate, polyether sulfone, epoxy resins, epoxyacrylate resins, acrylic resins, coumarin compounds, chalcone compounds, cinnamate compounds, fulgide compounds, anthraquinone compounds, azo compounds, and arylethene compounds. Compounds aligned by rubbing are preferably compounds whose crystallization is promoted by the alignment treatment or a heating process after the alignment treatment. Of compounds used in the alignment treatment other than rubbing, photoalignment materials are preferably used.

(Coating)

Coating methods for obtaining the optically anisotropic body according to the present invention include publicly-known methods, such as applicator method, bar coating method, spin coating method, gravure print method, flexographic method, inkjet method, die coating method, cap coating method, and dipping. The polymerizable composition solution is dried after application.

(Polymerization Process)

The polymerization of the dried polymerizable composition typically involves photoirradiation with, for example, ultraviolet rays, or heating while the polymerizable compound represented by general formula (1) in the polymerizable composition is in a planar alignment. Specifically, the polymerization by photoirradiation preferably involves irradiation with ultraviolet light of 390 nm or less, most preferably involves irradiation with light having a wavelength of 250 to 370 nm. It is noted that, when ultraviolet light of 390 nm or less causes decomposition of the polymerizable composition and the like, polymerization by ultraviolet light of 390 nm or more may be preferred. This light is preferably unpolarized diffused light.

(Retardation Film)

A retardation film according to the present invention is produced in the same manner as the optically anisotropic body according to the present invention. When the polymerizable compound represented by general formula (1) in the polymerizable composition is polymerized in a planar alignment, a retardation film having in-plane birefringence with respect to the base is obtained. The retardation film can be used as a homogeneous liquid crystal film. When the polymerizable compound represented by general formula (1) in the polymerizable composition and the polymerizable chiral compound are polymerized in a planar alignment, a retardation film having out-of-plane birefringence with respect to the base is obtained. When the polymerizable compound represented by general formula (1) in the polymerizable composition containing the polymerizable discotic compound is polymerized in a planar alignment, a retardation film having both in-plane and out-of-plane birefringence with respect to the base is obtained.

When the base has phase difference, a retardation film having birefringence resulting from the addition of the birefringence of the base and the birefringence of the retardation film according to the present invention is obtained. With regard to the retardation film, the birefringence of the base and the birefringence of the retardation film may be in the same in-plane direction or in a different in-plane direction. The retardation film is applied in a suitable form depending on applications, such as liquid crystal devices, displays, optical elements, optical components, coloring agents, security markings, members for laser luminescence, optical films, and compensation films.

(Retardation Patterned Film)

A retardation patterned film of the present invention is a laminate including in sequence a base, an alignment film, and a polymer of the polymerizable composition solution, like the optically anisotropic body according to the present invention. The retardation patterned film is a film patterned so as to obtain partially-different phase difference in the polymerization step. Patterning may include pattering in different directions, such as linear patterning, lattice patterning, circle patterning, and polygon patterning. The retardation patterned film is applied depending on applications, such as liquid crystal devices, displays, optical elements, optical components, coloring agents, security markings, members for laser luminescence, optical films, and compensation films.

A method for obtaining partially-different phase difference involves providing an alignment film on a base, and aligning the polymerizable composition in accordance with pattering when the polymerizable composition solution according to the present invention is applied and dried in the alignment treatment. Examples of the alignment treatment include a fine rubbing treatment, a polarized ultraviolet visible light irradiation treatment through a photomask, and a fine shape processing treatment. The alignment film used is a publicly-known alignment film. Examples of alignment films include those formed of compounds, such as polyimide, polysiloxane, polyamide, polyvinyl alcohol, polycarbonate, polystyrene, polyphenylene ether, polyarylate, polyethylene terephthalate, polyether sulfone, epoxy resins, epoxyacrylate resins, acrylic resins, coumarin compounds, chalcone compounds, cinnamate compounds, fulgide compounds, anthraquinone compounds, azo compounds, arylethene compounds, and the like. Compounds aligned by fine rubbing are preferably compounds whose crystallization is promoted by the alignment treatment or a heating process after the alignment treatment. Of compounds used in the alignment treatment other than rubbing, photoalignment materials are preferably used.

EXAMPLES

The present invention will be described below by way of Synthesis Examples, Examples, and Comparative Examples, but the present invention is not limited thereto. Unless otherwise indicated, the units "part" and "%" are on a mass basis.

(Preparation of Polymerizable Composition Solution (1))

To 400 parts of a solvent mixture (C-1) of toluene/propylene glycol monomethyl ether acetate (60/40) were added 30 parts of the polymerizable compound represented by formula (A-1), 30 parts of the polymerizable compound represented by formula (A-2), 20 parts of the polymerizable compound represented by formula (B-1), 20 parts of the polymerizable compound represented by formula (B-2), 4 parts of Irgacure 907 (D-1), 0.1 parts of p-methoxyphenol (E-1), 0.2 parts of liquid paraffin (F-1), and 0.1 parts of MEGAFACE F-554 (F-2), followed by heating at 50° C. for one hour. The mixture was then filtered through a 0.1-μm membrane filter to give a polymerizable composition solution (1) according to the present invention.

(Preparation of Polymerizable Composition Solutions (2) to (70))

Polymerizable composition solutions (2) to (45) and (57) to (70) according to the present invention and noninventive polymerizable composition solutions (46) to (56) were obtained in the same manner as in the preparation of the polymerizable composition solution (1) according to the present invention. Tables 1 to 4 indicate specific compositions of the polymerizable composition solutions (1) to (70) according to the present invention.

TABLE 1

| Compound | (1) | (2) | (3) | (4) | (5) | (6) | (7) | (8) | (9) | (10) | (11) | (12) | (13) | (14) |
|---|---|---|---|---|---|---|---|---|---|---|---|---|---|---|
| (A-1) | 30 | 50 | 50 | 50 | 15 | 45 | 45 | 45 | 45 | 45 | 30 | 40 | 50 | 20 |
| (A-2) | 30 |  |  |  | 15 | 45 | 45 | 45 | 45 | 45 |  | 40 |  | 20 |
| (A-3) |  |  |  |  |  |  |  |  |  |  | 30 |  | 30 |  |
| (A-4) |  |  |  |  |  |  |  |  |  |  |  |  |  |  |
| (A-5) |  |  |  |  |  |  |  |  |  |  |  |  |  |  |
| (A-6) |  |  |  |  |  |  |  |  |  |  |  |  |  |  |
| (A-7) |  |  |  |  |  |  |  |  |  |  |  |  |  |  |
| (B-1) | 20 | 25 | 25 |  | 35 | 5 |  |  |  |  | 20 | 10 | 10 | 30 |
| (B-2) | 20 | 25 |  | 25 | 35 | 5 |  |  |  |  | 20 | 10 | 10 | 30 |
| (B-3) |  |  |  |  |  |  |  |  |  |  |  |  |  |  |
| (B-4) |  |  |  | 25 |  |  |  |  |  |  |  |  |  |  |
| (B-5) |  |  | 25 |  |  |  |  |  |  |  |  |  |  |  |
| (B-6) |  |  |  |  |  |  | 10 |  |  |  |  |  |  |  |
| (B-7) |  |  |  |  |  |  |  | 10 |  |  |  |  |  |  |
| (B-8) |  |  |  |  |  |  |  |  | 10 |  |  |  |  |  |
| (B-9) |  |  |  |  |  |  |  |  |  | 10 |  |  |  |  |
| (C-1) | 400 | 400 | 400 | 400 | 400 | 400 | 400 | 400 | 400 | 400 | 400 | 400 | 400 | 400 |
| (C-2) |  |  |  |  |  |  |  |  |  |  |  |  |  |  |
| (C-3) |  |  |  |  |  |  |  |  |  |  |  |  |  |  |
| (C-4) |  |  |  |  |  |  |  |  |  |  |  |  |  |  |
| (C-5) |  |  |  |  |  |  |  |  |  |  |  |  |  |  |
| (C-6) |  |  |  |  |  |  |  |  |  |  |  |  |  |  |
| (C-7) |  |  |  |  |  |  |  |  |  |  |  |  |  |  |
| (D-1) | 4 | 4 | 4 | 4 | 4 | 4 | 4 | 4 | 4 | 4 | 4 | 4 | 4 | 4 |
| (D-2) |  |  |  |  |  |  |  |  |  |  |  |  |  |  |
| (D-3) |  |  |  |  |  |  |  |  |  |  |  |  |  |  |
| (E-1) | 0.1 | 0.1 | 0.1 | 0.1 | 0.1 | 0.1 | 0.1 | 0.1 | 0.1 | 0.1 | 0.1 | 0.1 | 0.1 | 0.1 |
| (F-1) | 0.2 | 0.2 | 0.2 | 0.2 | 0.2 | 0.2 | 0.2 | 0.2 | 0.2 | 0.2 | 0.2 | 0.2 | 0.2 | 0.2 |
| (F-2) | 0.1 | 0.1 | 0.1 | 0.1 | 0.1 | 0.1 | 0.1 | 0.1 | 0.1 | 0.1 | 0.1 | 0.1 | 0.1 | 0.1 |
| (F-3) |  |  |  |  |  |  |  |  |  |  |  |  |  |  |

TABLE 2

| Compound | (15) | (16) | (17) | (18) | (19) | (20) | (21) | (22) | (23) | (24) | (25) | (26) | (27) | (28) |
|---|---|---|---|---|---|---|---|---|---|---|---|---|---|---|
| (A-1) | 20 | 30 | 30 | 30 | 30 | 30 | 30 | 30 | 30 | 30 | 30 | 30 | 30 | 20 |
| (A-2) |  | 30 | 30 | 30 | 30 | 30 | 30 | 30 | 20 | 20 | 20 | 20 | 20 | 20 |
| (A-3) | 20 |  |  |  |  |  |  |  |  |  |  |  | 10 | 20 |
| (A-4) |  |  |  |  |  |  |  |  | 10 |  |  |  |  |  |
| (A-5) |  |  |  |  |  |  |  |  |  | 10 |  |  |  |  |
| (A-6) |  |  |  |  |  |  |  |  |  |  | 10 |  |  |  |
| (A-7) |  |  |  |  |  |  |  |  |  |  |  | 10 |  |  |
| (B-1) | 30 |  | 20 |  | 20 | 20 | 10 | 20 | 20 | 20 | 20 | 20 | 20 | 20 |
| (B-2) | 30 | 20 |  | 20 | 10 | 10 | 20 | 10 | 20 | 20 | 20 | 20 | 20 | 20 |
| (B-3) |  | 20 |  |  |  |  |  |  |  |  |  |  |  |  |
| (B-4) |  |  |  | 20 |  |  |  |  |  |  |  |  |  |  |
| (B-5) |  |  | 20 |  |  |  |  |  |  |  |  |  |  |  |
| (B-6) |  |  |  |  |  | 10 |  |  |  |  |  |  |  |  |
| (B-7) |  |  |  |  |  |  | 10 |  |  |  |  |  |  |  |
| (B-8) |  |  |  |  |  |  |  | 10 |  |  |  |  |  |  |
| (B-9) |  |  |  |  |  |  |  |  | 10 |  |  |  |  |  |
| (C-1) | 400 | 400 | 400 | 400 | 400 | 400 | 400 | 400 | 400 | 400 | 400 | 400 | 400 | 400 |
| (C-2) |  |  |  |  |  |  |  |  |  |  |  |  |  |  |
| (C-3) |  |  |  |  |  |  |  |  |  |  |  |  |  |  |
| (C-4) |  |  |  |  |  |  |  |  |  |  |  |  |  |  |
| (C-5) |  |  |  |  |  |  |  |  |  |  |  |  |  |  |
| (C-6) |  |  |  |  |  |  |  |  |  |  |  |  |  |  |
| (C-7) |  |  |  |  |  |  |  |  |  |  |  |  |  |  |
| (D-1) | 4 | 4 | 4 | 4 | 4 | 4 | 4 | 4 | 4 | 4 | 4 | 4 | 4 | 4 |
| (D-2) |  |  |  |  |  |  |  |  |  |  |  |  |  |  |
| (D-3) |  |  |  |  |  |  |  |  |  |  |  |  |  |  |
| (E-1) | 0.1 | 0.1 | 0.1 | 0.1 | 0.1 | 0.1 | 0.1 | 0.1 | 0.1 | 0.1 | 0.1 | 0.1 | 0.1 | 0.1 |
| (F-1) | 0.2 | 0.2 | 0.2 | 0.2 | 0.2 | 0.2 | 0.2 | 0.2 | 0.2 | 0.2 | 0.2 | 0.2 | 0.2 | 0.2 |

TABLE 2-continued

| Compound | \multicolumn{14}{c}{Solution} |
| --- | --- | --- | --- | --- | --- | --- | --- | --- | --- | --- | --- | --- | --- | --- |
|  | (15) | (16) | (17) | (18) | (19) | (20) | (21) | (22) | (23) | (24) | (25) | (26) | (27) | (28) |
| (F-2) | 0.1 | 0.1 | 0.1 | 0.1 | 0.1 | 0.1 | 0.1 | 0.1 | 0.1 | 0.1 | 0.1 | 0.1 | 0.1 | 0.1 |
| (F-3) |  |  |  |  |  |  |  |  |  |  |  |  |  |  |

TABLE 3

| Compound | Solution | | | | | | | | | | | | | |
| --- | --- | --- | --- | --- | --- | --- | --- | --- | --- | --- | --- | --- | --- | --- |
|  | (29) | (30) | (31) | (32) | (33) | (34) | (35) | (36) | (37) | (38) | (39) | (40) | (41) | (42) |
| (A-1) | 20 | 20 | 20 | 20 | 20 | 30 | 30 | 30 | 30 | 30 | 30 | 30 | 30 | 30 |
| (A-2) | 20 | 20 | 20 | 20 | 20 | 30 | 30 | 30 | 30 | 30 | 30 | 30 | 30 | 30 |
| (A-3) |  |  |  |  | 10 |  |  |  |  |  |  |  |  |  |
| (A-4) | 10 |  |  |  |  |  |  |  |  |  |  |  |  |  |
| (A-5) |  | 10 |  |  |  |  |  |  |  |  |  |  |  |  |
| (A-6) |  |  | 10 |  |  |  |  |  |  |  |  |  |  |  |
| (A-7) |  |  |  | 10 |  |  |  |  |  |  |  |  |  |  |
| (B-1) | 20 | 20 | 20 | 20 | 20 | 20 | 20 | 20 | 20 | 20 | 20 | 20 | 20 | 20 |
| (B-2) | 20 | 20 | 20 | 20 | 20 | 20 | 20 | 20 | 20 | 20 | 20 | 20 | 20 | 20 |
| (B-3) |  |  |  |  |  |  |  |  |  |  |  |  |  |  |
| (B-4) |  |  |  |  |  |  |  |  |  |  |  |  |  |  |
| (B-5) | 10 | 10 | 10 | 10 | 10 |  |  |  |  |  |  |  |  |  |
| (B-6) |  |  |  |  |  |  |  |  |  |  |  |  |  |  |
| (B-7) |  |  |  |  |  |  |  |  |  |  |  |  |  |  |
| (B-8) |  |  |  |  |  |  |  |  |  |  |  |  |  |  |
| (B-9) |  |  |  |  |  |  |  |  |  |  |  |  |  |  |
| (C-1) | 400 | 400 | 400 | 400 | 400 |  |  |  |  | 300 | 200 |  | 200 | 200 |
| (C-2) |  |  |  |  |  | 400 |  |  |  |  |  | 200 |  |  |
| (C-3) |  |  |  |  |  |  |  |  |  | 100 |  |  |  |  |
| (C-4) |  |  |  |  |  |  |  |  |  |  | 200 |  |  |  |
| (C-5) |  |  |  |  |  |  | 400 |  |  |  |  | 200 |  |  |
| (C-6) |  |  |  |  |  |  |  | 400 |  |  |  |  | 200 |  |
| (C-7) |  |  |  |  |  |  |  |  | 400 |  |  |  |  | 200 |
| (D-1) | 4 | 4 | 4 | 4 | 4 | 4 | 4 | 4 | 4 | 4 | 4 | 4 | 4 | 4 |
| (D-2) |  |  |  |  |  |  |  |  |  |  |  |  |  |  |
| (D-3) |  |  |  |  |  |  |  |  |  |  |  |  |  |  |
| (E-1) | 0.1 | 0.1 | 0.1 | 0.1 | 0.1 | 0.1 | 0.1 | 0.1 | 0.1 | 0.1 | 0.1 | 0.1 | 0.1 | 0.1 |
| (F-1) | 0.2 | 0.2 | 0.2 | 0.2 | 0.2 | 0.2 | 0.2 | 0.2 | 0.2 | 0.2 | 0.2 | 0.2 | 0.2 | 0.2 |
| (F-2) | 0.1 | 0.1 | 0.1 | 0.1 | 0.1 | 0.1 | 0.1 | 0.1 | 0.1 | 0.1 | 0.1 | 0.1 | 0.1 | 0.1 |
| (F-3) |  |  |  |  |  |  |  |  |  |  |  |  |  |  |

TABLE 4

| Compound | Solution | | | | | | | | | | | | | |
| --- | --- | --- | --- | --- | --- | --- | --- | --- | --- | --- | --- | --- | --- | --- |
|  | (43) | (44) | (45) | (46) | (47) | (48) | (49) | (50) | (51) | (52) | (53) | (54) | (55) | (56) |
| (A-1) | 30 | 30 | 30 |  | 15 | 30 | 30 |  | 30 |  |  |  | 30 | 40 |
| (A-2) | 30 | 30 | 30 | 30 | 30 |  | 15 |  |  | 30 | 30 | 30 | 40 | 30 |
| (A-3) |  |  |  |  |  |  |  | 30 |  |  |  |  |  |  |
| (A-4) |  |  |  | 30 | 15 |  |  |  |  | 30 | 30 | 30 | 20 |  |
| (A-5) |  |  |  |  |  | 30 | 15 |  |  |  |  |  |  | 20 |
| (A-6) |  |  |  |  |  |  |  | 30 |  |  |  |  |  |  |
| (A-7) |  |  |  |  |  |  |  |  | 30 |  |  |  |  |  |
| (B-1) | 20 | 20 | 20 | 20 | 20 | 20 | 20 | 20 | 20 | 20 | 20 | 20 | 10 |  |
| (B-2) | 20 | 20 | 20 | 20 | 20 | 20 | 20 | 20 | 20 | 20 | 20 | 20 |  | 10 |
| (B-3) |  |  |  |  |  |  |  |  |  |  |  |  |  |  |
| (B-4) |  |  |  |  |  |  |  |  |  |  |  |  |  |  |
| (B-5) |  |  |  |  |  |  |  |  |  |  |  |  |  |  |
| (B-6) |  |  |  |  |  |  |  |  |  |  |  |  |  |  |
| (B-7) |  |  |  |  |  |  |  |  |  |  |  |  |  |  |
| (B-8) |  |  |  |  |  |  |  |  |  |  |  |  |  |  |
| (B-9) |  |  |  |  |  |  |  |  |  |  |  |  |  |  |
| (C-1) | 400 | 400 | 400 | 400 | 400 | 400 | 400 | 400 | 400 |  |  |  | 400 | 400 |
| (C-2) |  |  |  |  |  |  |  |  |  |  |  |  |  |  |
| (C-3) |  |  |  |  |  |  |  |  |  |  |  |  |  |  |
| (C-4) |  |  |  |  |  |  |  |  |  |  |  |  |  |  |
| (C-5) |  |  |  |  |  |  |  |  |  | 400 |  |  |  |  |
| (C-6) |  |  |  |  |  |  |  |  |  |  | 400 |  |  |  |
| (C-7) |  |  |  |  |  |  |  |  |  |  |  | 400 |  |  |
| (D-1) |  |  | 4 | 4 | 4 | 4 | 4 | 4 | 4 | 4 | 4 | 4 | 4 | 4 |
| (D-2) |  | 4 |  |  |  |  |  |  |  |  |  |  |  |  |

TABLE 4-continued
| Compound | Solution | | | | | | | | | | | | | |
|---|---|---|---|---|---|---|---|---|---|---|---|---|---|---|
| | (43) | (44) | (45) | (46) | (47) | (48) | (49) | (50) | (51) | (52) | (53) | (54) | (55) | (56) |
| (D-3) | | 4 | | | | | | | | | | | | |
| (E-1) | 0.1 | 0.1 | 0.1 | 0.1 | 0.1 | 0.1 | 0.1 | 0.1 | 0.1 | 0.1 | 0.1 | 0.1 | 0.1 | 0.1 |
| (F-1) | 0.2 | 0.2 | | 0.2 | 0.2 | 0.2 | 0.2 | 0.2 | 0.2 | 0.2 | 0.2 | 0.2 | 0.2 | 0.2 |
| (F-2) | 0.1 | 0.1 | 0.1 | 0.1 | 0.1 | 0.1 | 0.1 | 0.1 | 0.1 | 0.1 | 0.1 | 0.1 | 0.1 | 0.1 |
| (F-3) | | | 0.1 | | | | | | | | | | | |
TABLE 5
| Compound | Solution | | | | | | | | | | | | | |
|---|---|---|---|---|---|---|---|---|---|---|---|---|---|---|
| | (57) | (58) | (59) | (60) | (61) | (62) | (63) | (64) | (65) | (66) | (67) | (68) | (69) | (70) |
| (A-1) | 40 | 40 | 40 | 40 | 35 | 40 | 40 | 40 | 40 | 38 | 40 | 40 | 40 | 40 |
| (A-2) | 30 | 30 | 30 | 30 | 25 | | 30 | 30 | 30 | 29 | 30 | 30 | 30 | 30 |
| (A-3) | | | | | | 30 | | | | | | | | |
| (B-1) | | | | | | | | | | | | | | |
| (B-2) | 25 | 25 | 25 | 25 | 20 | 25 | | 25 | 25 | 24 | 21 | 21 | 21 | 21 |
| (B-3) | | | | | 15 | | | | | | | | | |
| (B-4) | | | | | | | | | | | | | | |
| (B-5) | | | | | | | 25 | | | | | | | |
| (C-1) | 400 | 400 | 400 | 400 | 400 | 400 | 400 | 200 | 400 | 400 | 400 | 400 | 200 | 400 |
| (C-2) | | | | | | | | | | | | | | |
| (C-3) | | | | | | | | | | | | | | |
| (C-4) | | | | | | | | | | | | | | |
| (C-5) | | | | | | | | | | | | | | |
| (C-6) | | | | | | | | | 200 | | | | 200 | |
| (C-7) | | | | | | | | | | | | | | |
| (D-1) | 4 | 4 | 4 | 4 | 4 | 4 | 4 | 4 | | 4 | 4 | 4 | 4 | |
| (D-2) | | | | | | | | | 4 | | | | | 4 |
| (D-3) | | | | | | | | | | | | | | |
| (E-1) | 0.1 | 0.1 | 0.1 | 0.1 | 0.1 | 0.1 | 0.1 | 0.1 | 0.1 | 0.1 | 0.1 | 0.1 | 0.1 | 0.1 |
| (F-1) | 0.2 | 0.2 | 0.2 | 0.2 | 0.2 | 0.2 | 0.2 | 0.2 | 0.2 | 0.2 | 0.2 | 0.2 | 0.2 | 0.2 |
| (F-2) | 0.1 | 0.1 | 0.1 | 0.1 | 0.1 | 0.1 | 0.1 | 0.1 | 0.1 | 0.1 | 0.1 | 0.1 | 0.1 | 0.1 |
| (F-3) | | | | | | | | | | | | | | |
| (G-1) | 5 | | | | 5 | 5 | 5 | 5 | 5 | 9 | | | | |
| (G-2) | | 5 | | | | | | | | | | | | |
| (G-3) | | | 5 | | | | | | | | | | | |
| (G-4) | | | | 5 | | | | | | | | | | |
| (G-5) | | | | | | | | | | | 9 | | | |
| (G-6) | | | | | | | | | | | | 9 | 9 | 9 |
[Chem. 56]
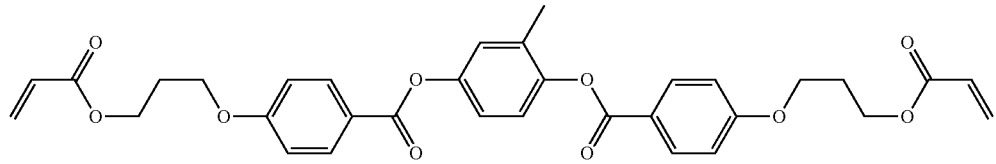
(A-1)
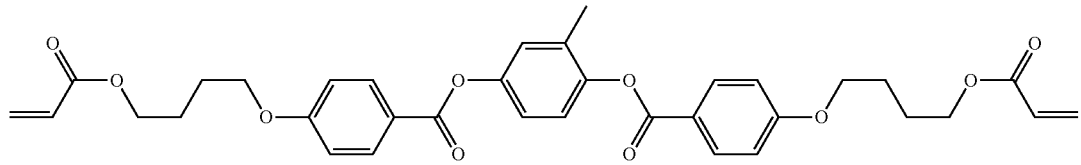
(A-2)
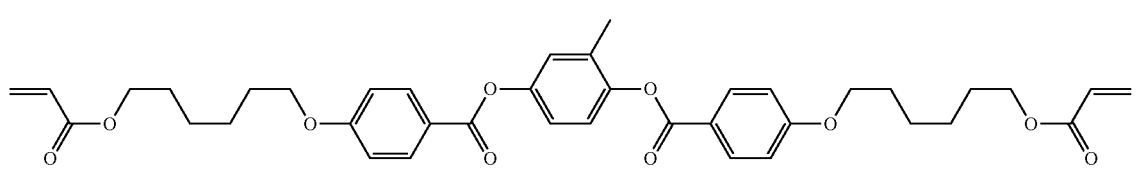
(A-3)

-continued
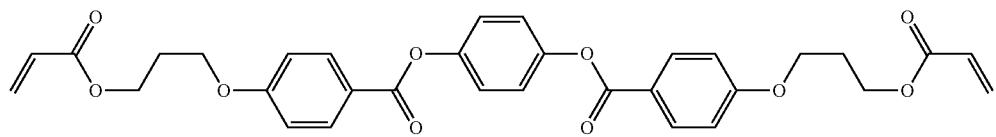
(A-4)
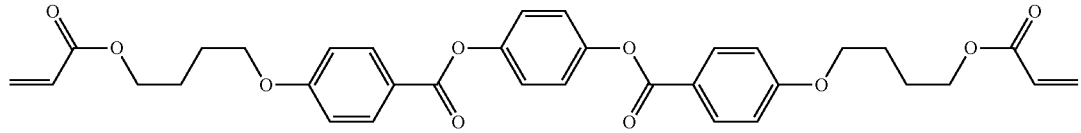
(A-5)
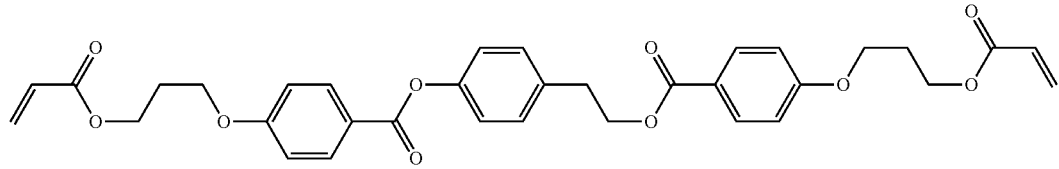
(A-6)
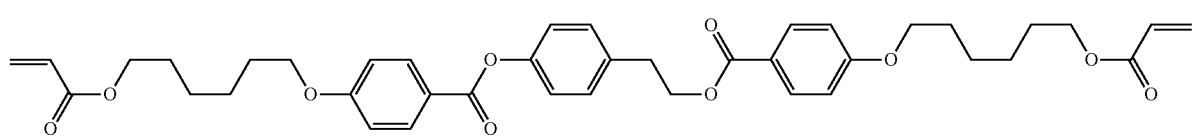
(A-7)
[Chem. 57]
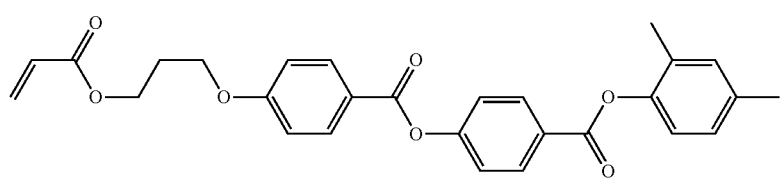
(B-1)
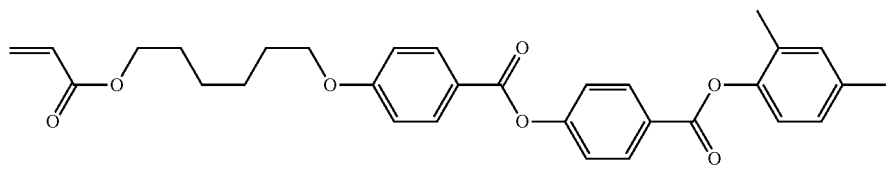
(B-2)
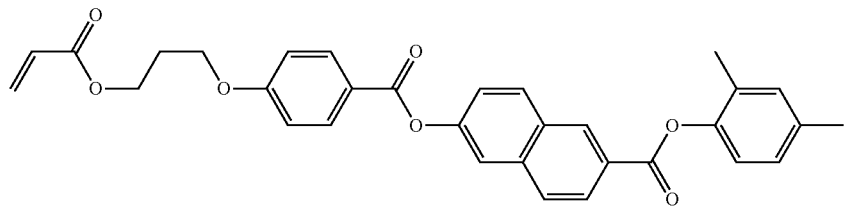
(B-3)
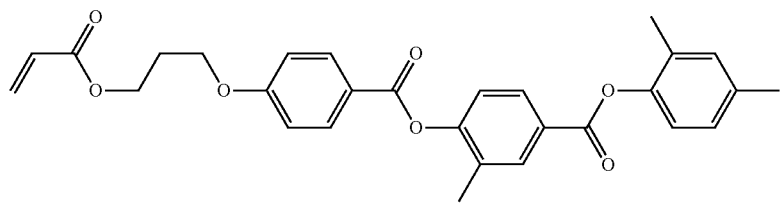
(B-4)
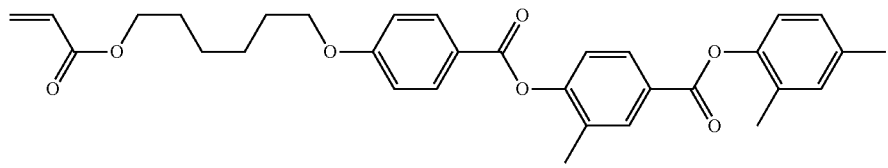
(B-5)

-continued
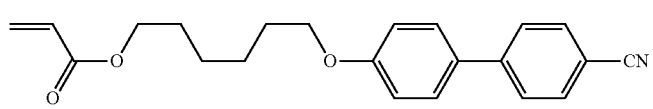
(B-6)
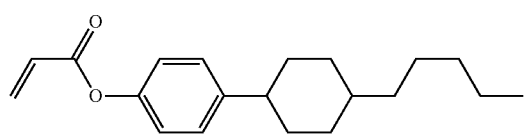
(B-7)
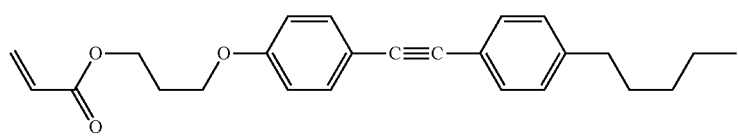
(B-8)
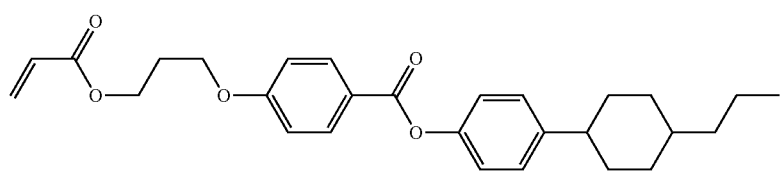
(B-9)
Toluene/propylene glycol monomethyl ether acetate (60/40) (C-1)
Propylene glycol monomethyl ether acetate (C-2)
Propylene glycol diacetate (C-3)
Propylene glycol monomethyl ether (C-4)
Toluene (C-5)
Methyl isobutyl ketone (C-6)
Anisole (C-7)
Irgacure 907 (D-1)
Irgacure OXE 01 (D-2)
Irgacure 651 (D-3)
p-Methoxyphenol (E-1)
Liquid paraffin (F-1)
MEGAFACE F-554 (F-2)
Tecnoflon N535 (F-3)
[Chem. 58]
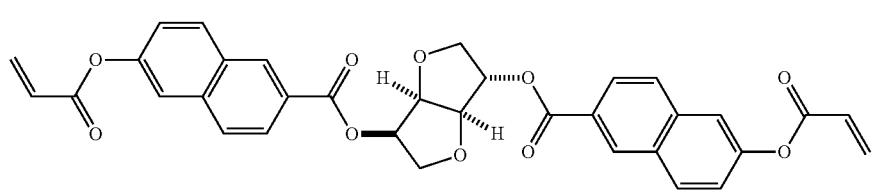
(G-1)
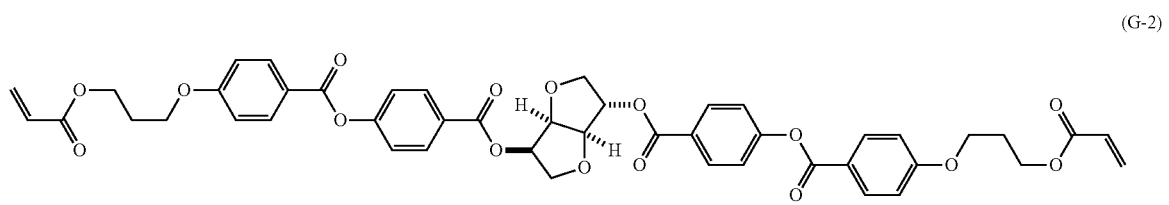
(G-2)
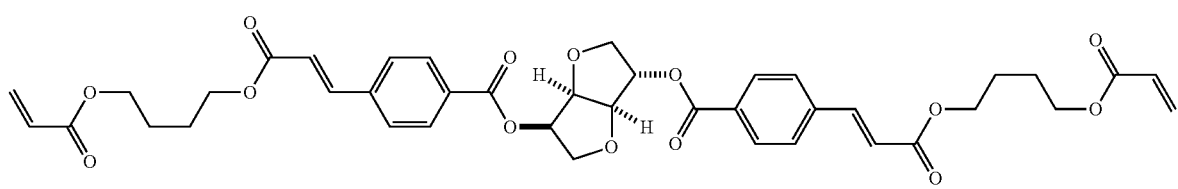
(G-3)

-continued
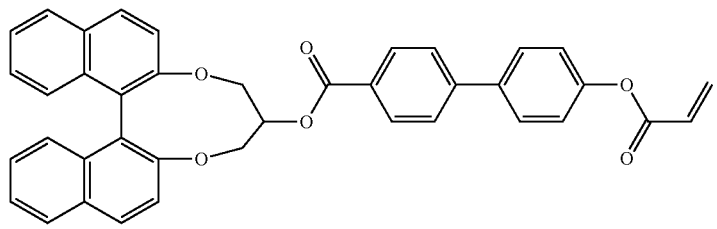
(G-4)
[Chem. 59]
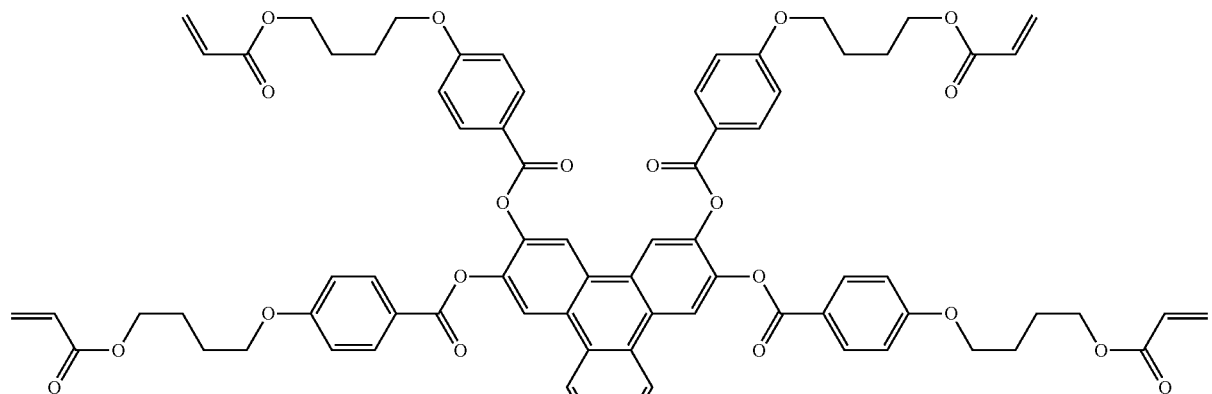
(G-5)
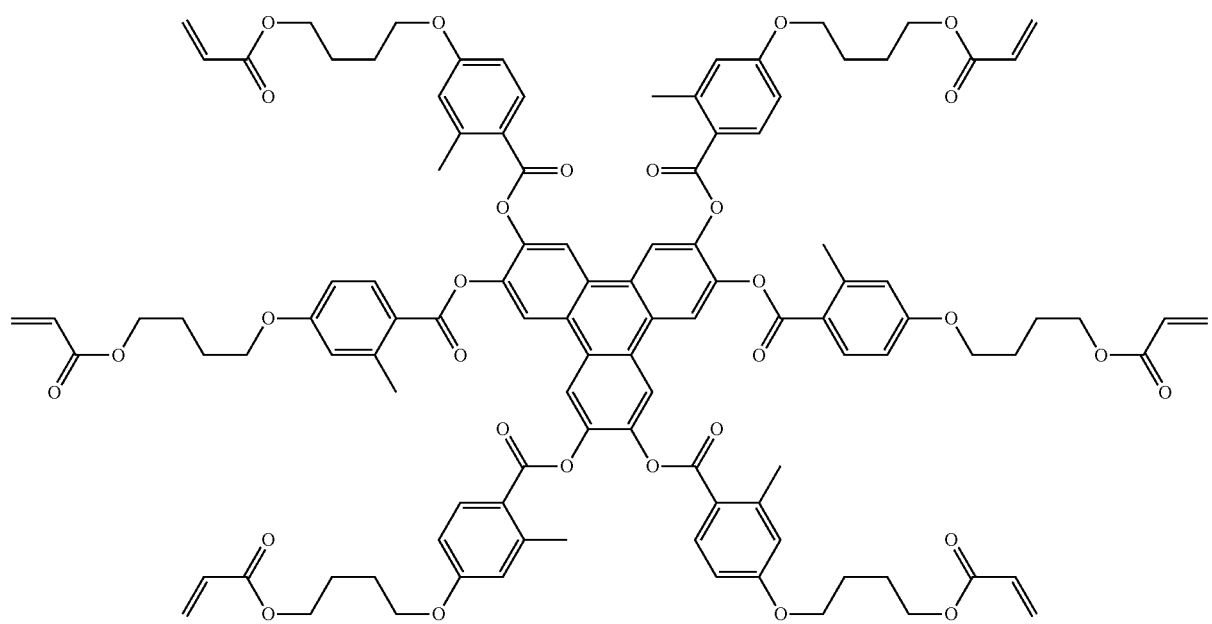
(G-6)
Example 1
The state of the prepared polymerizable composition solution was observed after storage at 0° C. for one week. No precipitates were observed and the conditions at the time of preparation were maintained.
The prepared polymerizable composition solution was applied to a (TAC) triacetyl cellulose film with a bar coater

4 at room temperature and then dried at 80° C. for 2 minutes. The coating was then allowed to stand at room temperature for 15 minutes and then irradiated with UV light at an illumination of 500 mJ/cm² using a conveyer-type high-pressure mercury lamp (alignment properties 1).

Similarly, the prepared polymerizable composition solution was applied to a TAC film rubbed with a pile fabric using a bar coater #4 at room temperature and then dried at 80° C. for 2 minutes. The coating was then allowed to stand at room temperature for 15 minutes and then irradiated with UV light at an illumination of 500 mJ/cm² using a conveyer-type high-pressure mercury lamp (alignment properties 2).

A polyimide solution for an alignment film was applied to a glass substrate with a thickness of 0.7 mm by spin coating. The polyimide solution was dried at 100° C. for 10 minutes and then fired at 200° C. for 60 minutes to give a coating film. The resulting coating film was rubbed to provide a base. The prepared polymerizable composition solution was applied to the base with a spin coater and then dried at 80° C. for 2 minutes. Just after that, the coating was irradiated with UV light at an illumination of 500 mJ/cm² (alignment properties 3).

LIA-01 (available from DIC Corporation) was applied to a glass substrate with a spin coater and dried at 80° C. for one minute. The coating film with a dry thickness of 15 nm was irradiated with linearly-polarized parallel light of visible ultraviolet rays near a wavelength of 365 nm (irradiation intensity: 20 mW/cm²) vertically to a base using an extra-high pressure mercury lamp through a wavelength cut filter, a band pass filter, and a polarizing filter (irradiation dose: 100 mJ/cm²) to give a photoalignment film. The prepared polymerizable composition solution was applied to the resulting photoalignment film with a spin coater and then dried at 80° C. for 2 minutes. Just after that, the coating was irradiated with UV light at an illumination of 500 mJ/cm² (alignment properties 4).

As a result, good alignment properties are observed in all alignment-property tests. The obtained results are shown in Table 5.

(Solution Stability)
A: A homogeneous solution is maintained without precipitates.
C: Precipitates are partially observed.
(Alignment Properties)
A: No defects are observed visually or under a polarizing microscope.
B: No defects are visually observed, but non-alignment parts are entirely observed under a polarizing microscope.
C: Partially-formed defects are visually observed, and non-alignment parts are entirely observed under a polarizing microscope.
-: not measured

TABLE 6

| | Solution | Solution Stability | Alignment Properties 1 | Alignment Properties 2 | Alignment Properties 3 | Alignment Properties 4 |
|---|---|---|---|---|---|---|
| Example 1 | Solution (1) | A | A | A | A | A |
| Example 2 | Solution (2) | A | A | A | A | A |
| Example 3 | Solution (3) | A | A | A | A | A |
| Example 4 | Solution (4) | A | A | A | A | A |
| Example 5 | Solution (5) | A | A | A | A | A |
| Example 6 | Solution (6) | A | A | A | A | A |
| Example 7 | Solution (7) | A | A | A | A | A |
| Example 8 | Solution (8) | A | A | A | A | A |
| Example 9 | Solution (9) | A | A | A | A | A |
| Example 10 | Solution (10) | A | A | A | A | A |
| Example 11 | Solution (11) | A | A | A | A | A |
| Example 12 | Solution (12) | A | A | A | A | A |
| Example 13 | Solution (13) | A | A | A | A | A |
| Example 14 | Solution (14) | A | A | A | A | A |
| Example 15 | Solution (15) | A | A | A | A | A |
| Example 16 | Solution (16) | A | A | A | A | A |
| Example 17 | Solution (17) | A | A | A | A | A |
| Example 18 | Solution (18) | A | A | A | A | A |
| Example 19 | Solution (19) | A | A | A | A | A |
| Example 20 | Solution (20) | A | A | A | A | A |
| Example 21 | Solution (21) | A | A | A | A | A |
| Example 22 | Solution (22) | A | A | A | A | A |
| Example 23 | Solution (23) | A | A | A | A | A |
| Example 24 | Solution (24) | A | A | A | A | A |
| Example 25 | Solution (25) | A | A | A | A | A |

TABLE 7

| | Solution | Solution Stability | Alignment Properties 1 | Alignment Properties 2 | Alignment Properties 3 | Alignment Properties 4 |
|---|---|---|---|---|---|---|
| Example 26 | Solution (26) | A | A | A | A | A |
| Example 27 | Solution (27) | A | A | A | A | A |
| Example 28 | Solution (28) | A | A | A | A | A |
| Example 29 | Solution (29) | A | A | A | A | A |
| Example 30 | Solution (30) | A | A | A | A | A |
| Example 31 | Solution (31) | A | A | A | A | A |
| Example 32 | Solution (32) | A | A | A | A | A |
| Example 33 | Solution (33) | A | A | A | A | A |
| Example 34 | Solution (34) | A | — | — | A | A |
| Example 35 | Solution (35) | A | A | A | A | A |

TABLE 7-continued

|  | Solution | Solution Stability | Alignment Properties 1 | Alignment Properties 2 | Alignment Properties 3 | Alignment Properties 4 |
|---|---|---|---|---|---|---|
| Example 36 | Solution (36) | A | — | — | A | A |
| Example 37 | Solution (37) | A | — | — | A | A |
| Example 38 | Solution (38) | A | — | — | A | A |
| Example 39 | Solution (39) | A | — | — | A | A |
| Example 40 | Solution (40) | A | — | — | A | A |
| Example 41 | Solution (41) | A | — | — | A | A |
| Example 42 | Solution (42) | A | — | — | A | A |
| Example 43 | Solution (43) | A | A | A | A | A |
| Example 44 | Solution (44) | A | A | A | A | A |
| Example 45 | Solution (45) | A | A | A | A | A |

TABLE 8

|  | Solution | Solution Stability | Alignment Properties 1 | Alignment Properties 2 | Alignment Properties 3 | Alignment Properties 4 |
|---|---|---|---|---|---|---|
| Example 46 | Solution (57) | A | A | — | A | — |
| Example 47 | Solution (58) | A | A | — | A | — |
| Example 48 | Solution (59) | A | A | — | A | — |
| Example 49 | Solution (60) | A | A | — | A | — |
| Example 50 | Solution (61) | A | A | — | A | — |
| Example 51 | Solution (62) | A | A | — | A | — |
| Example 52 | Solution (63) | A | A | — | A | — |
| Example 53 | Solution (64) | A | A | — | A | — |
| Example 54 | Solution (65) | A | A | — | A | — |
| Example 55 | Solution (66) | A | A | — | A | — |
| Example 56 | Solution (67) | A | A | — | A | — |
| Example 57 | Solution (68) | A | A | — | A | — |
| Example 58 | Solution (69) | A | A | — | A | — |
| Example 59 | Solution (70) | A | A | — | A | — |

TABLE 9

|  | Solution | Solution Stability | Alignment Properties 1 | Alignment Properties 2 | Alignment Properties 3 | Alignment Properties 4 |
|---|---|---|---|---|---|---|
| Comparative Example 1 | Solution (46) | C | C | C | A | C |
| Comparative Example 2 | Solution (47) | B | C | B | A | B |
| Comparative Example 3 | Solution (48) | A | C | B | B | B |
| Comparative Example 4 | Solution (49) | B | C | B | A | B |
| Comparative Example 5 | Solution (50) | A | C | B | A | C |
| Comparative Example 6 | Solution (51) | A | C | B | A | C |
| Comparative Example 7 | Solution (52) | C | C | C | A | C |
| Comparative Example 8 | Solution (53) | C | — | — | A | C |
| Comparative Example 9 | Solution (54) | C | — | — | A | C |
| Comparative Example 10 | Solution (55) | C | C | B | A | B |
| Comparative Example 11 | Solution (56) | C | C | B | A | B |

Examples 2 to 59, Comparative Examples 1 to 11

In the same manner as in Example 1, the state of the polymerizable composition solutions according to the present invention in Examples 2 to 59 and Comparative Examples 1 to 11 was observed after storage at 0° C. for one week. In addition, the alignment properties 1 to 4 were determined using the resulting polymerizable composition solutions. The obtained results are shown in Tables 5 to 7.

As a result, all of the polymerizable composition solutions according to the present invention showed no precipitates and thus maintained the conditions at the time of preparation. In these alignment-property tests, all of the polymerizable composition solutions according to the present invention also had good alignment properties. Since all of the polymerizable composition solutions according to the present invention had good storage stability as well as good alignment properties, these solutions were found to have excellent productivity.

However, the results of Comparative Examples 1 to 11 indicated that, unless the polymerizable compound intramolecularly having a 2-methyl-1,4-phenylene group was present at an amount of 90 mass % or more, polymerizable composition solutions having good solution stability and alignment properties were not obtained.

The invention claimed is:

1. A solution comprising a polymerizable composition and an organic solvent, wherein the polymerizable composition contains 90 mass % or more of at least one polymerizable compound selected from polymerizable compounds represented by general formula (1-1) and general formula (1-2):

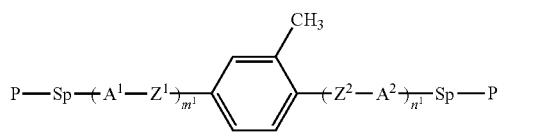

(1-1)

wherein in formula (1-1) P represents a polymerizable functional group; Sp represents a single bond or a spacer group, wherein the spacer group is an alkylene group having 1 to 18 carbon atoms, wherein the spacer group is optionally substituted with at least one halogen atom or CN, and one $CH_2$ group or at least two nonadjacent $CH_2$ groups are optionally each independently substituted with —O—, —S—, —NH—, —N($CH_3$)—, —CO—, —COO—, —SCO—, —COS—, or —C≡C—, as long as oxygen atoms are not directly bonded to each other; when at least two P are present, the at least two P are the same or different; and when at least two Sp are present, the at least two Sp are the same or different, $A^1$ and $A^2$ each independently represent a (b) a 1,4-phenylene group (one —CH═ or two or more nonadjacent —CH═ in this group may be substituted with —N═), $Z^1$ and $Z^2$ each independently represent a single bond, —COO—, —OCO—, or —C≡C—; and $m^1$ and $n^1$ each independently represent 0, 1, 2, 3, or 4, and $m^1+n^1$ four or less; when $m^1$ is 2 to 4 and two or more $A^1$ and $Z^1$ are present, two or more $A^1$ and two or more $Z^1$ are each the same or different; when $n^1$ is 2 to 4 and two or more $A^2$ and $Z^2$ are present, two or more $A^2$ and two or more $Z^2$ are each the same or different,

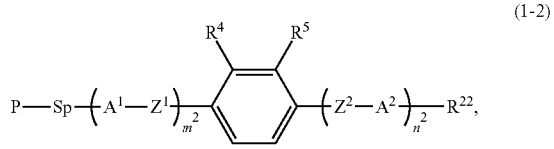

(1-2)

wherein in formula (1-2) P represents a polymerizable functional group; Sp represents a single bond or a spacer group, wherein the spacer group is an alkylene group having 1 to 18 carbon atoms, wherein the spacer group is optionally substituted with at least one halogen atom or CN, and one $CH_2$ group or at least two nonadjacent $CH_2$ groups are optionally each independently substituted with —O—, —S—, —NH—, —N($CH_3$)—, —CO—, —COO—, —SCO—, —COS—, or —C≡C—, as long as oxygen atoms are not directly bonded to each other; when at least two P are present, the at least two P are the same or different and when at least two Sp are present, the at least two Sp can be the same or different, $A^1$ and $A^2$ each independently represent a group selected from the group consisting of:
(a) 1,4-cyclohexylene group (one —$CH_2$— or two or more nonadjacent —$CH_2$— in this group may be substituted with —O— or —S—);
(b) a 1,4-phenylene group (one —CH═ or two or more nonadjacent —CH═ in this group is optionally substituted with —N═), and
(c) naphthalene-2,6-diyl group optionally substituted with a alkyl group having 1 carbon atom $Z^1$ and $Z^2$ each independently represent a single bond, —COO—, —OCO—, or —C≡C—;

where one of $R^4$ and $R^5$ represents a hydrogen atom and the other represents a methyl group, $R^{22}$ represents a hydrogen atom, a halogeno group, a cyano group, or aalkyl group having 1 to 8 carbon atoms, and one —$CH_2$— or two or more nonadjacent —$CH_2$— in the alkyl group is optionally each independently substituted with —CH═CH—, —C≡C—, —O—, —CO—, —COO—, or —OCO—, and at least one hydrogen atom in the alkyl group may be substituted with a fluorine atom or a chlorine atom, and $m^2$ and $n^2$ each independently represent 0, 1, 2, 3, or 4, and $m^2+n^2$ four or less; when $m^2$ is 2 to 4 and two or more $A^1$ and $Z^1$ are present, two or more $A^1$ and two or more $Z^1$ are each the same or different when $n^2$ is 2 to 4 and two or more $A^2$ and $Z^2$ are present, two or more $A^2$ and two or more $Z^2$ are each the same or different, wherein the polymerizable composition comprises 30 to 90 mass % of the polymerizable compound represented by general formula (1-1).

2. The solution according to claim 1, wherein the organic solvent is at least one of ketone solvents, ether solvents, ester solvents, and aromatic hydrocarbon solvents.

3. The solution according to claim 1, further comprising a polymerization initiator.

4. The solution according to claim 1, further comprising a polymerizable chiral compound.

5. The solution according to claim 1, further comprising a polymerizable discotic compound.

6. The solution according to claim 1, further comprising a surfactant.

7. An optically anisotropic body comprising a dried and cured product of the solution according to claim 1.

8. A retardation film comprising a dried and cured product of the solution according to claim 1.

9. An optical compensation film comprising a dried and cured product of the solution according to claim 1.

10. A retardation patterned film comprising a dried and cured product of the solution according to claim 1.

11. A homogeneously aligned liquid crystal film comprising a dried and cured product of the solution according to claim 1.

12. A laminated optically anisotropic body having a laminate of a plurality of the optically anisotropic bodies according to claim 7.

* * * * *